US010329504B1

(12) United States Patent
Kuhn et al.

(10) Patent No.: US 10,329,504 B1
(45) Date of Patent: Jun. 25, 2019

(54) METHOD AND SYSTEM FOR PRODUCING REFINED BIOMETHANE FROM A RENEWABLE NATURAL GAS SOURCE

(71) Applicant: BioResource Development, LLC, Omaha, NE (US)

(72) Inventors: Gary Kuhn, Omaha, NE (US); Gregory S. MacLean, Lincoln, NE (US); Tom Senne, Omaha, NE (US); Fred Scarpello, Omaha, NE (US)

(73) Assignee: BioResource Development, LLC, Omaha, NE (US)

( * ) Notice: Subject to any disclaimer, the term of this patent is extended or adjusted under 35 U.S.C. 154(b) by 33 days.

(21) Appl. No.: 15/351,008

(22) Filed: Nov. 14, 2016

Related U.S. Application Data

(60) Provisional application No. 62/254,632, filed on Nov. 12, 2015.

(51) Int. Cl.
*B01D 53/02* (2006.01)
*C10L 3/10* (2006.01)
(Continued)

(52) U.S. Cl.
CPC ............ *C10L 3/105* (2013.01); *B01D 53/047* (2013.01); *B01D 53/266* (2013.01); *C10L 3/106* (2013.01); B01D 2253/116 (2013.01); B01D 2256/245 (2013.01); B01D 2257/504 (2013.01); B01D 2257/55 (2013.01); B01D 2257/708 (2013.01);
(Continued)

(58) Field of Classification Search
CPC ............... B01D 53/047; B01D 53/266; B01D 2253/116; B01D 2256/245; B01D 2257/504; B01D 2257/55; B01D 2257/708; C10L 3/105; C10L 3/106; C10L 2290/06;
(Continued)

(56) References Cited

U.S. PATENT DOCUMENTS 8,308,945 B2 11/2012 Kotelko et al.
8,603,199 B2 12/2013 Steele et al.
(Continued)

FOREIGN PATENT DOCUMENTS

KR 20120119755 A * 10/2012

OTHER PUBLICATIONS

Translation of KR-20120119755-A, Oct. 2012, Kim Moon Sik.*

*Primary Examiner* — Christopher P Jones
(74) *Attorney, Agent, or Firm* — Suiter Swantz pc llo

(57) ABSTRACT

A system and method for producing refined biomethane gas from a renewable natural gas source. The method may include receiving, by a vessel, processed biogas, the processed biogas having been processed from a renewable natural gas source. The method may include receiving, by a nitrogen rejection vessel assembly comprising a nitrogen rejection vessel, gas from the vessel. The method may include separating, by the nitrogen rejection vessel assembly, at least some nitrogen-containing molecules from the received gas. The method may include outputting, by the nitrogen rejection vessel assembly, nitrogen-removed gas. The method may include compressing, by a compressor, the nitrogen-removed gas. The method may include removing, by a dehydration vessel, at least some moisture from the compressed nitrogen-removed gas. The method may include outputting, by the dehydration vessel, refined biomethane gas.

17 Claims, 12 Drawing Sheets

(51) Int. Cl.
   *B01D 53/047* (2006.01)
   *B01D 53/26* (2006.01)
(52) U.S. Cl.
   CPC ....... *C10L 2290/06* (2013.01); *C10L 2290/08* (2013.01); *C10L 2290/30* (2013.01); *C10L 2290/542* (2013.01); *C10L 2290/547* (2013.01)
(58) Field of Classification Search
   CPC ............ C10L 2290/08; C10L 2290/30; C10L 2290/542; C10L 2290/547
   See application file for complete search history.

(56) References Cited

U.S. PATENT DOCUMENTS

| | | | |
|---|---|---|---|
| 2007/0068386 A1* | 3/2007 | Mitariten | B01D 53/04 95/116 |
| 2011/0094378 A1* | 4/2011 | Mitariten | B01D 53/229 95/50 |
| 2011/0185896 A1* | 8/2011 | Sethna | B01D 53/002 95/45 |
| 2015/0005398 A1* | 1/2015 | Chakravarti | C10K 1/004 518/702 |
| 2015/0119611 A1 | 4/2015 | Ball et al. | |
| 2016/0250584 A1* | 9/2016 | De Godos Crespo | B01D 53/1468 95/92 |
| 2017/0102182 A1* | 4/2017 | Tremblay | F25J 3/0209 |
| 2017/0283292 A1* | 10/2017 | Kim | B01D 71/06 |
| 2018/0079672 A1* | 3/2018 | Meyer | B01D 53/1493 |
| 2018/0112142 A1* | 4/2018 | Foody | B01D 53/047 |
| 2018/0221817 A1* | 8/2018 | Prasad | B01D 53/75 |
| 2018/0273864 A1* | 9/2018 | Urade | B01J 23/75 |

* cited by examiner

METHOD AND SYSTEM FOR PRODUCING REFINED BIOMETHANE FROM A RENEWABLE NATURAL GAS SOURCE

CROSS-REFERENCE TO RELATED APPLICATIONS

This application claims the benefit of U.S. Provisional Application No. 62/254,632, filed on Nov. 12, 2015, which is hereby expressly incorporated herein in its entirety.

BACKGROUND

As organic materials (e.g., organic waste materials) decompose in various systems (e.g., landfills (e.g., solid-waste landfills), wastewater treatment plants (WWTPs), agricultural waste facilities (e.g., livestock waste facilities), food waste digestion facilities, or other organic waste digesters), gases and other liquid byproducts are often generated. For example, with respect to landfills, the byproducts typically include landfill gas, condensate, and leachate. Landfill gas is a complex mixture of different gases created by the action of microorganisms within a landfill. Landfill gas typically includes approximately forty to sixty percent methane, with the remainder being mostly carbon dioxide. Other constituents of landfill gas may include oxygen, nitrogen, hydrogen sulfide, siloxanes, and some inert particulates. Land fill gas may also include trace amounts (e.g., less than 1%) of other volatile organic compounds (VOCs). Such trace gases may include a large array of species, but are typically mainly simple hydrocarbons.

Municipal Solid Waste (MSW) landfill owners and operators are required to comply with the Laws and Regulations of the United States Environmental Protection Agency's (EPA) Resource Conservation and Recovery Act (RCRA) which was enacted by Congress in 1976 to protect human health and the environment from the potential hazards of waste disposal, conserve energy and natural resources, reduce the amount of waste generated, and ensure that wastes are managed in an environmentally sound manner. RCRA, Subtitle D regulates the management of nonhazardous solid waste. It establishes minimum federal technical standards and guidelines for state solid waste plans in order to promote environmentally sound management of solid waste.

Depending on a variety of conditions, MSW owners may or may not be required to collect and destroy landfill gases. Some MSW owners collect and destroy landfill gas voluntarily, usually to control odors. Odors can diminish the value and potential use of land in the areas surrounding landfills, and the landfill footprint may not be returnable to a public use such as a park or nature trail.

Other MSW landfills are required to collect and destroy the landfill gas to destroy or diminish greenhouse gas emissions in compliance with EPA regulations. Many operating and closed MSW landfills that collect landfill gas and destroy the collected landfill gas do not attempt to provide a beneficial use of the collected landfill gas. Landfill gas if not collected, and either destroyed or processed into a beneficial use, results in release of greenhouse gases, including methane and carbon dioxide. Landfill gas can be a source of air pollution, and the associated leachate and condensate liquids can be water pollutants.

Currently, landfill utilization has multiple problems. For example, there is a lack of active and, in particular, closed landfills with systems in place capable of producing pipeline-quality biomethane. Because closed landfills typically produce landfill gas at a continuously declining rate, closed landfills may be essentially relegated to "dead land" as the declining annual production of gas constrains the ability to finance and recover, over a short time frame, large initial capital investments associated with implementing existing systems. Compounding this "dead land" model, landfills are highly regulated from an environmental standpoint. Air emissions, groundwater contaminants, methane migration, hazardous waste content in the biogas, and other impacts can make closed landfills unattractive for development. Additionally, pipeline utilities have been typically reluctant to accept landfill-produced biomethane for fear of introducing contaminants into their pipelines. Landfills typically differ from other biogas sources in that oxygen and nitrogen from the atmosphere can be present in the gas. Oxygen contamination is a significant problem for producing pipeline-quality biomethane, and nitrogen is also costly to remove.

Additionally, there has been a long felt need in the closed landfill industry for utilizing the landfill gas rather than just flaring off the landfill gas.

SUMMARY

In one aspect, embodiments of the inventive concepts disclosed herein are directed to a system. The system may include a vessel, a nitrogen rejection vessel assembly, a compressor, and a dehydration vessel. The vessel may be configured to receive and contain processed biogas including biomethane, where the processed biogas was processed from a renewable natural gas source. The nitrogen rejection vessel assembly may include a nitrogen rejection vessel. The nitrogen rejection vessel assembly may be coupled to the vessel. The at least one nitrogen rejection vessel may be configured to receive gas from the vessel, separate at least some nitrogen-containing molecules from the received gas, and output nitrogen-removed gas. The compressor may be coupled to the nitrogen rejection vessel assembly. The compressor may be configured to receive the nitrogen-removed gas from the nitrogen rejection vessel assembly and compress the nitrogen-removed gas. The dehydration vessel may be coupled to the compressor. The dehydration vessel may be configured to receive the compressed nitrogen-removed gas from the at least one compressor, remove at least some moisture from the compressed nitrogen-removed gas, and output refined biomethane gas.

In a further aspect, embodiments of the inventive concepts disclosed herein are directed to a system. The system may include a vessel, a nitrogen rejection vessel assembly, a compressor, a dehydration vessel, and a control system. The vessel may be configured to receive and contain processed biogas including biomethane, where the processed biogas was processed from a renewable natural gas source. The nitrogen rejection vessel assembly may include a nitrogen rejection vessel. The nitrogen rejection vessel assembly may be coupled to the vessel. The at least one nitrogen rejection vessel may be configured to receive gas from the vessel, separate at least some nitrogen-containing molecules from the received gas, and output nitrogen-removed gas. The compressor may be coupled to the nitrogen rejection vessel assembly. The compressor may be configured to receive the nitrogen-removed gas from the nitrogen rejection vessel assembly and compress the nitrogen-removed gas. The dehydration vessel may be coupled to the compressor. The dehydration vessel may be configured to receive the compressed nitrogen-removed gas from the at least one compressor, remove at least some moisture from the compressed nitrogen-removed gas, and output refined biomethane gas. The control system may be configured to control at least one of the vessel, the nitrogen rejection vessel assembly, the nitrogen rejection vessel, the compressor, or the dehydration vessel. The control system may include at least one controller and a computing device. The computing device may include a processor and memory.

In a further aspect, embodiments of the inventive concepts disclosed herein are directed to a method for producing refined biomethane gas from a renewable natural gas source. The method may include receiving, by a vessel, processed biogas, the processed biogas having been processed from a renewable natural gas source. The method may include receiving, by a nitrogen rejection vessel assembly comprising a nitrogen rejection vessel, gas from the vessel. The method may include separating, by the nitrogen rejection vessel assembly, at least some nitrogen-containing molecules from the received gas. The method may include outputting, by the nitrogen rejection vessel assembly, nitrogen-removed gas. The method may include compressing, by a compressor, the nitrogen-removed gas. The method may include removing, by a dehydration vessel, at least some moisture from the compressed nitrogen-removed gas. The method may include outputting, by the dehydration vessel, refined biomethane gas.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
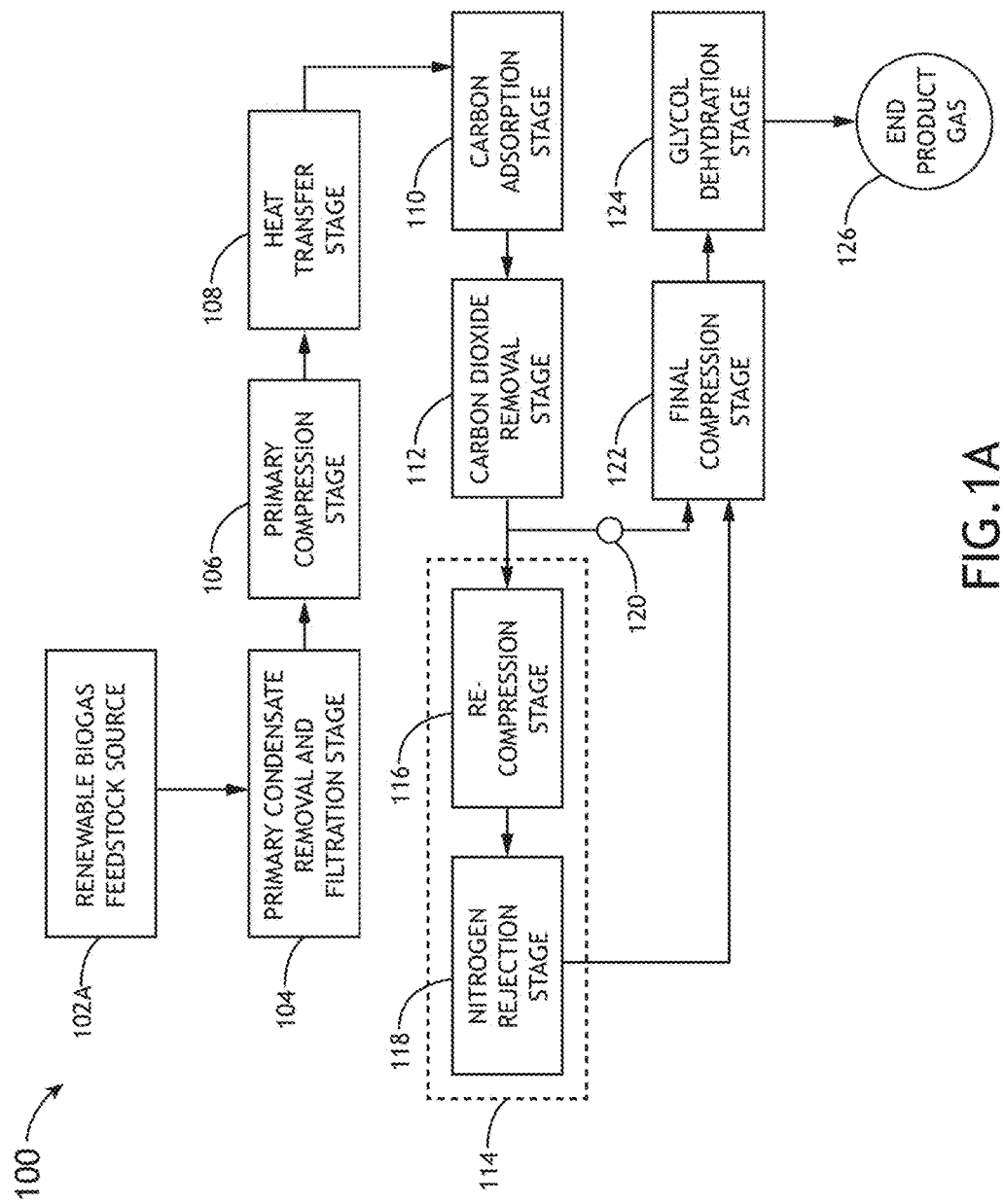
FIG. 1A is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., $1$, $1a$, $1b$). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and system. Some embodiments may include methods and systems for producing biomethane for distribution, such as to the energy grid or to vehicles. Some embodiments may receive a renewable biogas feedstock source (e.g., a renewable natural gas source) from any of various systems (e.g., landfills (e.g., active or closed solid-waste landfills), wastewater treatment plants (WWTPs), agricultural waste facilities (e.g., livestock waste facilities), food waste digestion facilities, or other organic waste digesters) and process (e.g., convert and/or refine) the renewable biogas feedstock source into a high-quality biomethane gas (e.g., a refined biomethane gas) suitable for distribution (e.g., via pipelines or vehicle transportation), utilities, energy production, end-use, or the like.

For example with respect to closed landfills, some embodiments may include methods and systems including some or all of the following: a landfill gas collection system, closed landfill, landfill gas condensate separation operation, raw gas conditioning/dehumidification, condensate destruction system, dual effect heat exchange, dual effect molecular adsorption processing, and integrated process control for producing and manufacturing pipeline quality biomethane as an alternative to flaring/combusting the landfill gas. Embodiments may significantly reduce the emission of greenhouse gasses and may displace fossil fuels by supplying biomethane as alternative fuel to petroleum fuel for transportation and other applications.

Some embodiments may include systems and methods for collecting and processing landfill gas into viable fuels and widely distributing the processed landfill gas. Additionally, some embodiments may convert MSW landfills into biomethane production sites.

For example, some embodiments may convert landfill gas from MSW landfills, such as active or closed MSW landfills, into pipeline-quality biomethane suitable for interstate transportation and distribution (e.g., via interstate pipelines). Such pipeline-quality biomethane may be delivered to discrete fueling stations via the interstate gas pipeline system for the purpose of, for example, fueling CNG-powered vehicles and displacing fossil fuels. For example, such conversion of landfill gas may be performed within waste conversion facilities through vacuum collection, moisture separation, pressure driven selective adsorption, dehumidification, multiple stage storage, carbon adsorption, multiple stage compression, dehydration, monitoring, measurement, distribution, and sales.

Some embodiments may include methods and systems that solve or improve at least some of the referenced challenges and problems associated with landfills; for example, some embodiments may be configured to make closed landfills viable or more viable for producing pipeline-quality biomethane. Embodiments may utilize any of various suitable processes and equipment arranged and operated in any suitable particular sequence.

Some embodiments, which may be associated with or include a landfill, may include a combination of some or all of the following processes and equipment: at least one landfill gas collection system (e.g., a modulated and adjustable landfill gas collection system), condensate separation, dehumidification, condensate destruction, monitoring (e.g., simultaneous real-time monitoring) and/or control (e.g., simultaneous real-time control) of gas quality such as by utilizing mass spectrometry, rejection of non-methane gasses, and final dehydration. Additionally, such processes may be performed by any of various suitable equipment and components, and such equipment (or components or systems) may be configured to perform such corresponding processes.

Some embodiments include removing water condensate and/or vapor from landfill gas such that pipeline-quality biomethane can be produced. Because landfill gas typically creates or includes significant amounts of water condensate, some embodiments include removing such water condensate such that pipeline-quality biomethane may be produced. In addition, with respect to closed and regulated landfills, the condensate may be collected and disposed of in a regulated wastewater treatment facility or another active classified landfill, or alternatively, the condensate can be destroyed by combustion at high temperature. Some embodiments overcome the problem of liquid condensate in the raw gas being drawn into subsequent gas production vessels, by utilizing or placing at least one low pressure gravity collection vessel in the water condensate removal process. Such a vessel may also be configured to accept active low temperature dehumidification condensate produced by gas chilling. For example, incorporating a single low pressure collection vessel for all condensate volume allows for required monitoring and metering. As such, the condensate can then be routed to a destruction process to comply with environmental permits or regulations.

Some embodiments include modulation of the landfill gas collection system. Modulation of the landfill gas collection system allows for controlling and limiting volumes of atmospheric oxygen and nitrogen that can be ingested by the landfill. For example, intrusions of small volumes of atmospheric air into a landfill can render the landfill gas unsuitable for biomethane production. Typical landfill gas comprises the following in the gas phase: methane, carbon dioxide, nitrogen, oxygen water vapor and trace amounts of sulfur and other organics. In some embodiments, simultaneous monitoring of landfill gas composition may be accomplished by utilizing a real-time mass spectrometer instrument with process control output to continuously monitor gas composition within the system. Placing real time feedback control into the process may provide for modulation of the landfill gas collection system.

Another problem associated with closed landfill gas for biomethane production is the low flows relative to other types of landfills (e.g., active landfills). Some embodiments include multiple process vessels in parallel to improve (e.g., optimize) the gas collection per unit time.

In some embodiments, initial carbon dioxide rejection vessels are installed and arranged to operate in parallel such that raw gas is continuously entering a process vessel for biomethane production, and this may significantly reduce (e.g., minimize) recycle of raw gas into the landfill and the associated pressure transients. A constant flow allows for efficient control of the landfill gas collection system and reduces (e.g., minimizes or eliminates) composition fluctuations.

Some embodiments may include at least one processor configured to run various software applications or computer code stored in a non-transitory computer-readable medium and configured to execute various instructions or operations, including but not limited to instructions or operations associated with processes, systems, functions, and methods disclosed throughout. The at least one processor may be configured to run various software applications or computer code stored in a non-transitory computer-readable medium and configured to execute various instructions or operations as disclosed throughout and configured to perform any suitable functions. The at least one processor may be implemented in any number (e.g., at least one, two, or more) of computing devices that may or may not be interconnected over a network (e.g., a local area network (LAN), wireless area network (WAN), the Internet, or a combination thereof) and/or communicatively coupled (e.g., via a network) with other computing devices. Such computing devices may include at least one processor, memory, storage, or the like, and such computing devices may include or be communicatively coupled to any of various suitable sensors configured to measure properties (e.g., pressure, gas composition, temperature, flow rate, mass, weight, etc.) associated with systems and processes disclosed throughout.

Referring now to FIG. 1A, an exemplary embodiment of a system 100 according to the inventive concepts disclosed herein is depicted. In some embodiments, the system 100 is, is implemented as, or includes a biogas refinery. For example, the system 100 may be, may be implemented as or may include a landfill biogas refinery (e.g., a solid waste landfill biogas refinery (e.g., an MSW landfill biogas refinery); an active landfill biogas refinery or a closed landfill biogas refinery), a waste treatment plant biogas refinery (e.g., a WWTP biogas refinery), a waste facility biogas refinery (e.g., an agricultural waste facility biogas refinery), or a digestion facility biogas refinery (e.g., a food waste digestion facility biogas refinery).

The system 100 includes a renewable biogas feedstock source 102A, a plurality of stages (e.g., primary condensate removal and filtration stage 104, primary compression stage 106, heat transfer stage 108, carbon adsorption stage 110, carbon dioxide removal stage 112, recompression stage 116, nitrogen rejection stage 118, final compression stage 122, and/or glycol dehydration stage 124), and end product gas 126. In some embodiments, the system 100 may include one or more additional stages, such as disclosed throughout, and/or omit one or more of the plurality of stages. Additionally, while exemplarily stages have been depicted and described, in some embodiments, one or more of the exemplarily stages may include or be implemented as a plurality of stages (e.g., repeated stages, related stages, sub-stages, parallel stages, serial stages, and/or a combination thereof), which, for example, may be arranged in parallel or in series. In some embodiments, any or all of the plurality of stages, as well as components thereof, may be omitted, optional, activated (e.g., controllably activated), deactivated (e.g., controllably deactivated), adjusted (e.g., controllably adjusted), powered (e.g., controllably powered), controlled, bypassed (e.g., controllably bypassed), some combination thereof, and/or the like.

While the plurality of stages are exemplarily depicted and described as a plurality of discrete stages, the inventive concepts disclosed herein are not limited to discrete "stages", and some embodiments may include stages that overlap with other stages. For example, the inventive concepts disclosed herein may be implemented as and/or include any suitable systems, apparati, and/or combinations thereof configured to perform any suitable process(es) with or without reference to "stages". Some embodiments may include any suitable groupings, arrangements, configurations, or order of systems, apparati, and/or processes.

Additionally, while not described in detail with respect to FIG. 1A, the system 100 may include and/or components of the system 100 may be coupled to one another via any suitable pipes, hoses, lines, bypass lines, loops, fittings, ports, couplers, valves (e.g., shut-off or isolation valves, one-way valves (e.g., check valves), back-flow preventers, control valves (e.g., solenoid valves, pneumatically controlled valves (e.g., pneumatic isolation valves), flow control valves, and/or motorized valves), multi-way valves, relief valves (e.g., pressure relief valves), or a combination thereof), regulators (e.g., pressure regulators), actuators, equipment (e.g., pumps, compressors, tanks (e.g., storage tanks or expansion tanks), vessels, filters, chillers (e.g., glycol chillers), heat exchangers, heaters (e.g., fluid heaters, boilers, oil heaters), or a combination thereof), molecular sieve adsorption devices, fluid separators (e.g., air separators, gas separators, liquid separators, condensate separators), sensors (e.g., digital sensors, analog sensors, mixed signal sensors, electromechanical sensors, pneumatic sensors, electropneumatic sensors, and/or electromagnetic sensors; e.g., pressure sensors, temperature sensors (e.g., thermocouples or thermometers), concentration sensors (e.g., gas concentration sensors), flow sensors, spectrometers (e.g., mass spectrometers), instruments (e.g., gas instruments (e.g., analytical gas instruments (e.g., gas chromatography instruments))), external system sensors (e.g., meteorological sensors (e.g., weather sensors, barometric pressure sensors, humidity sensors, external temperature sensors (e.g., air temperature sensors, ground temperature sensors)), meters, or a combination thereof), gages, power sources (e.g., electrical circuits, electrical outlets, batteries, generators (e.g., power generators), or a combination thereof), electrodes, catalysts, flares (e.g., flare stacks), burners, controllers (e.g., digital controllers, analog controllers, mixed signal controllers, pneumatic controllers, hydraulic controllers, or a combination thereof), computing devices (e.g., which may include processors, memory, storage, antennas, ports, networking components, user input/output devices, or a combination thereof), antennas, wires, cables, networks (e.g., a local area network (LAN), wireless area network (WAN), the Internet, intranets (e.g., secure intranets), mobile networks, satellite networks, or a combination thereof), networking devices (e.g., routers, network switches, network air gap, or a combination thereof), accessories, some combination thereof, or the like. Additionally, while not described in detail with respect to FIG. 1A, some or all of the plurality of stages and components thereof may be communicatively coupled to one another and/or controlled by communicatively coupled components of the system 100.

Figure 1B:
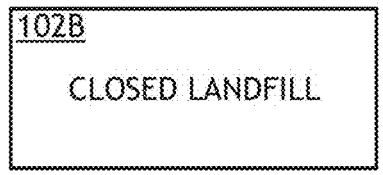
FIG. 1B is a view of the renewable biogas feedstock source of FIG. 1A implemented as a closed landfill according to the inventive concepts disclosed herein.
Figure 1C:
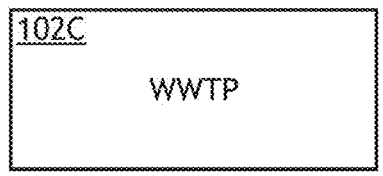
FIG. 1C is a view of the renewable biogas feedstock source of FIG. 1A implemented as a wastewater treatment plant according to the inventive concepts disclosed herein.
Figure 1D:
FIG. 1D is a view of the renewable biogas feedstock source of FIG. 1A implemented as an agricultural waste facility according to the inventive concepts disclosed herein.
Figure 1E:
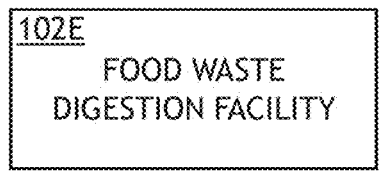
FIG. 1E is a view of the renewable biogas feedstock source of FIG. 1A implemented as a food waste digestion facility according to the inventive concepts disclosed herein.

The renewable biogas feedstock source 102A may be configured to generate biogas (e.g., renewable biogas (e.g., renewable natural gas); raw renewable biogas (e.g., raw renewable natural gas)) and/or provide (e.g., output, and/or supply) the biogas to the primary condensate removal and filtration stage 104. The renewable biogas feedstock source 102A may include or be implemented as any suitable source of renewable biogas. For example, referring now to FIGS. 1B-1E, the renewable biogas feedstock source 102A may be implemented as and/or include a landfill (e.g., a solid waste landfill (e.g., an MSW landfill); an active landfill or a closed landfill 102B (as shown in FIG. 1B)), a waste treatment plant (e.g., a WWTP 102C (as shown in FIG. 1C)), a waste facility (e.g., an agricultural waste facility 102D (as shown in FIG. 1D)), or a digestion facility (e.g., food waste digestion facility 102E (as shown in FIG. 1E)).

For example, with respect to a landfill (e.g., the closed landfill 102B), the renewable biogas may be the product of organic waste degradation in the landfill, and the renewable biogas may include methane, carbon dioxide, nitrogen, oxygen, and trace amounts of hydrogen sulfide and other organic compounds. In some embodiments, landfill renewable biogas may have significant nitrogen levels.

For example, with respect to the WWTP 102C, the renewable biogas may be the product of organic waste degradation in the WWTP 102C, and the renewable biogas may include methane, carbon dioxide, and trace amounts of hydrogen sulfide and other organic compounds. In some embodiments, WWTP renewable biogas may have low or negligible nitrogen levels.

Still referring to FIG. 1A, the system 100 may include a condensate removal and filtration stage (e.g., the primary condensate removal and filtration stage 104). The primary condensate removal and filtration stage 104 may be configured to receive the biogas (e.g., renewable natural gas) from the renewable biogas feedstock source 102A. The primary condensate removal and filtration stage 104 may be configured to process the received biogas by removing condensate from the received biogas and by filtering impurities, unwanted gasses, and/or matter (e.g., particulate matter, such as particulate matter larger than a threshold size) from such condensate-removed biogas. Further, the primary condensate removal and filtration stage 104 may be configured to provide such processed (e.g., condensate-removed and filtered) biogas to the primary compression stage 106 and/or another stage. For example, the primary condensate removal and filtration stage 104 may include structures and/or be implemented as exemplarily depicted in and described with respect to FIG. 2A, discussed in more detail below.

Still referring to FIG. 1A, the system 100 may include a first compression stage (e.g., the primary compression stage 106). The primary compression stage 106 may be configured to receive the processed biogas from the primary condensate removal and filtration stage 104. The primary compression stage 106 may be configured to further process the biogas by compressing such received biogas. Further, the primary compression stage 106 may be configured to provide such compressed biogas to the heat transfer stage 108 and/or another stage. For example, the primary compression stage 106 may include structures and/or be implemented as exemplarily depicted in and described with respect to FIG. 2A, discussed in more detail below.

The heat transfer stage 108 may be configured to receive the processed biogas from the primary compression stage 106. The heat transfer stage 108 may be configured to further process the biogas by altering the temperature (e.g., heating or chilling) such received biogas. For example, the heat transfer stage 108 may be a negative heat transfer stage such that the heat transfer stage 108 chills such received biogas. Further, the heat transfer stage 108 may be configured to provide such temperature-altered biogas to the carbon adsorption stage 110 and/or another stage. For example, the heat transfer stage 108 may include structures and/or be implemented as exemplarily depicted in and described with respect to FIG. 2B, discussed in more detail below.

The carbon adsorption stage 110 may be configured to receive the processed biogas from the heat transfer stage 108. The carbon adsorption stage 110 may be configured to further process the biogas by filtering out (e.g., via one or more adsorption processes (e.g., one or more pressure swing adsorption (PSA) processes)) at least some carbon-based molecules from such received biogas. For example, the carbon adsorption stage 110 may be configured to filter, by utilizing one or more adsorption processes, at least some VOCs and siloxanes from the received biogas. Further, the carbon adsorption stage 110 may be configured to provide such filtered biogas to the carbon dioxide removal stage 112 and/or another stage. For example, the carbon adsorption stage 110 may include structures and/or be implemented as exemplarily depicted in and described with respect to FIG. 2B, discussed in more detail below.

The carbon dioxide removal stage 112 may be configured to receive the processed biogas from the carbon adsorption stage 110. The carbon dioxide removal stage 112 may be configured to further process the biogas by filtering out (e.g., via one or more adsorption processes (e.g., one or more pressure swing adsorption (PSA) processes)) carbon dioxide from such received biogas. Further, the carbon dioxide removal stage 112 may be configured to provide such filtered biogas to the recompression stage 116, the final compression stage 122, and/or another stage. For example, the carbon dioxide removal stage 112 may include structures and/or be implemented as exemplarily depicted in and described with respect to FIG. 2C, discussed in more detail below.

In some embodiments, the system 100 includes a bypass line 120. The bypass line 120 may be positioned and coupled at a first end to a line configured to connect the carbon dioxide removal stage 112 and the recompression stage 116 and at a second to the final compression stage 122. In some embodiments, the bypass line allows biogas processes of the system 100 to bypass the recompression stage 116 and the nitrogen rejection stage 118, to omit the recompression stage 116 and the nitrogen rejection stage 118, or later add the recompression stage 116 and the nitrogen rejection stage 118. The bypass line 120 may include any suitable number, type, and arrangement of valves such that the bypass line can be opened, closed, partially opened, and/or controlled. While the bypass line 120 has been described and illustrated in an exemplary location and configuration. In some embodiments, the system 100 may include any suitable number of bypass lines in any suitable position and arrangement throughout the system 100. For example, in some embodiments, the system 100 may include bypass line(s) for any or all of the plurality of stages of the system 100 and/or for any or all of the mechanical components of any or all of the plurality of stages of the system 100 such that, for example, any or all of the plurality of stages of the system 100 and/or any or all of the mechanical components of any or all of the plurality of stages of the system 100 may be bypassed (e.g., controllably bypassed, such as by any controller(s) or computing device(s) of the system 100 controlling one or more control valves associated with or included with such bypass line(s)).

In some embodiments, the stage 114 may include one or more biogas processing stages. For example, the stage 114 may include one or more compression stages (e.g., at least one of the recompression stage 116) and/or one or more gas rejection stages (e.g., at least one of the nitrogen rejection stage 118). In some embodiments, the stage 114 may be omitted, optional, activated (e.g., controllably activated), deactivated (e.g., controllably deactivated), adjusted (e.g., controllably adjusted), and/or bypassed (e.g., controllably bypassed). For example, in some embodiments where the renewable biogas source 102A is implemented as or includes the WWTP 102C, the agricultural waste facility 102D, or the food waste digestion facility 102E, the stage 114 may be omitted or optional. Further, the stage 114 may be configured to provide processed biogas to the final compression stage 122 and/or another stage.

In some embodiments, the recompression stage 116 may be configured to receive the processed biogas from the carbon dioxide removal stage 112. The recompression stage 116 may be configured to further process the biogas by compressing such received biogas. Further, the recompression stage 116 may be configured to provide such compressed biogas to the nitrogen rejection stage 118 and/or another stage. For example, the recompression stage 116 may include structures and/or be implemented as exemplarily depicted in (e.g., first recompression stage 116A and/or second recompression stage 116B) and described with respect to FIGS. 2D and/or 2E, discussed in more detail below. In some embodiments, the recompression stage 116 may be omitted, optional, activated (e.g., controllably activated), deactivated (e.g., controllably deactivated), adjusted (e.g., controllably adjusted), and/or bypassed (e.g., controllably bypassed).

In some embodiments, the nitrogen rejection stage 118 may be configured to receive the processed biogas from the recompression stage 116. The nitrogen rejection stage 118 may be configured to further process the biogas by rejecting or separating (e.g., by utilizing an adsorption process (e.g., a pressure swing adsorption (PSA) process), such as to remove) nitrogen from such received biogas. Further, the nitrogen rejection stage 118 may be configured to provide processed biogas to the final compression stage 122 and/or another stage. For example, the nitrogen rejection stage 118 may include structures and/or be implemented as exemplarily depicted in (e.g., first nitrogen rejection vessel stage 118A and/or second nitrogen rejection vessel stage 118B) and described with respect to FIGS. 2D and/or 2E, discussed in more detail below. In some embodiments, the nitrogen rejection stage 118 may be omitted, optional, activated (e.g., controllably activated), deactivated (e.g., controllably deactivated), adjusted (e.g., controllably adjusted), and/or bypassed (e.g., controllably bypassed).

In some embodiments, the recompression stage 116, the nitrogen rejection stage 118, and/or some combination of components thereof may be repeated (e.g., repeated in series and/or parallel) any suitable number of times.

The final compression stage 122 may be configured to receive the processed biogas from the carbon dioxide removal stage 112 and/or the nitrogen rejection stage 118. The final compression stage 122 may be configured to further process the biogas by compressing such received biogas. Further, the final compression stage 122 may be configured to provide such compressed biogas to the glycol dehydration stage 124 and/or another stage. For example, the final compression stage 122 may include structures and/or be implemented as exemplarily depicted in and described with respect to FIG. 2F, discussed in more detail below. The final compression stage 116 is referred to as "final" for exemplary and illustrative purposes; in some embodiments, the system 100 may include additional or post-final-compression-stage compression stages or be configured to perform subsequent compression processes.

Still referring to FIG. 1A, the system 100 may include a dehydration stage (e.g., the glycol dehydration stage 124). The glycol dehydration stage 124 may be configured to receive the processed biogas from the final compression stage 122. The glycol dehydration stage 124 may be configured to further process the biogas by separating water or removing water (e.g., water vapor), such as by passing such received biogas through a vessel containing glycol, from such received biogas. Further, the glycol dehydration stage 124 may be configured to output end product gas 126 (e.g., biomethane gas, such as refined biomethane gas), which the glycol dehydration stage 124 may provide to an additional stage or which may be used for any suitable purpose. For example, the glycol dehydration stage 124 may include structures and/or be implemented as exemplarily depicted in and described with respect to FIG. 2F, discussed in more detail below. The end product gas 126 is referred to as "end product" for exemplary and illustrative purposes; in some embodiments, the end product gas 126 may be further processed.

While FIG. 1A exemplarily includes elements as shown, in some embodiments, one or more of the elements of the system 100 may be omitted, or the system 100 may include other elements. Additionally, while an embodiment has been depicted as including one of each the plurality of depicted stages, other embodiments may include any number (e.g., zero, one, two, or more) of each stage positioned anywhere in the system 100.

Referring now to FIGS. 2A-G, an exemplary embodiment of a system 200 according to the inventive concepts disclosed herein is depicted. In some embodiments, the system 200 is, is implemented as, or includes a renewable natural gas refinery. For example, the system 200 may be, may be implemented as, or may include a landfill renewable natural gas refinery (e.g., a solid waste landfill renewable natural gas refinery (e.g., an MSW landfill renewable natural gas refinery); e.g., an active landfill renewable natural gas refinery or a closed landfill renewable natural gas refinery), a waste treatment plant renewable natural gas refinery (e.g., a WWTP renewable natural gas refinery), a waste facility renewable natural gas refinery (e.g., an agricultural waste facility renewable natural gas refinery), and/or a digestion facility renewable natural gas refinery (e.g., a food waste digestion facility renewable natural gas refinery).

In some embodiments, the system 200 may be implemented as an example of the system 100 of FIG. 1A.

Referring still to FIGS. 2A-G, the system 200 includes a renewable natural gas source 202, a plurality of stages (e.g., primary condensate removal and filtration stage 104, primary compression stage 106, heat transfer stage 108, carbon adsorption stage 110, positive temperature change heat transfer stage 211, carbon dioxide removal stage 112, first recompression stage 116A, first nitrogen rejection vessel stage 118A, second recompression stage 116B, second nitrogen rejection vessel stage 118B, final compression stage 122, and/or glycol dehydration stage 124), monitoring and metering equipment 263, refined biomethane gas 264, a biomethane storage tank 265, gas odorization equipment 266, an odorized biomethane storage tank 267, a gas utility 268, a compressed natural gas (CNG) fast-fill station 270, a gas pipeline 272, and/or a CNG fast-fill station 274. In some embodiments, the system 100 may include one or more additional elements, such as disclosed throughout, and/or omit one or more of the elements. Additionally, while exemplarily stages have been depicted and described, in some embodiments, one or more of the exemplarily stages may include or be implemented as a plurality of stages (e.g., repeated stages, related stages, sub-stages, parallel stages, serial stages, and/or a combination thereof), which, for example, may be arranged in parallel or in series. In some embodiments, any or all of the plurality of stages and/or elements, as well as components thereof, may be omitted, optional, activated (e.g., controllably activated), deactivated (e.g., controllably deactivated), adjusted (e.g., controllably adjusted), powered (e.g., controllably powered), controlled, bypassed (e.g., controllably bypassed), some combination thereof, and/or the like.

While the plurality of stages are exemplarily depicted and described as a plurality of discrete stages, the inventive concepts disclosed herein are not limited to discrete "stages", and some embodiments may include stages that overlap with other stages. For example, the inventive concepts disclosed herein may be implemented as and/or include any suitable systems, apparati, and/or combinations thereof configured to perform any suitable process(es) with or without reference to "stages". Some embodiments may include any suitable groupings, arrangements, configurations, or order of systems, apparati, and/or processes.

Additionally, while not necessarily described in detail with respect to FIGS. 2A-G, the system 200 may include and/or components of the system 200 may be coupled (e.g., mechanically coupled and/or communicatively coupled) to one another via and/or by utilizing any suitable pipes, hoses, lines, bypass lines, loops, fittings, ports, couplers, valves (e.g., shut-off or isolation valves, one-way valves (e.g., check valves), back-flow preventers, control valves (e.g., solenoid valves, pneumatically controlled valves (e.g., pneumatic isolation valves), flow control valves, and/or motorized valves), multi-way valves, relief valves (e.g., pressure relief valves), or a combination thereof), regulators (e.g., pressure regulators), actuators, equipment (e.g., pumps, compressors, tanks (e.g., storage tanks or expansion tanks), vessels, filters, chillers (e.g., glycol chillers), heat exchangers, heaters (e.g., fluid heaters, boilers, oil heaters), or a combination thereof), molecular sieve adsorption devices, fluid separators (e.g., air separators, gas separators, liquid separators, condensate separators), sensors (e.g., digital sensors, analog sensors, mixed signal sensors, electromechanical sensors, pneumatic sensors, electropneumatic sensors, electrohydraulic sensors, and/or electromagnetic sensors; e.g., pressure sensors, temperature sensors (e.g., thermocouples or thermometers), concentration sensors (e.g., gas concentration sensors), flow sensors, spectrometers (e.g., mass spectrometers), instruments (e.g., gas instruments (e.g., analytical gas instruments (e.g., gas chromatography instruments)))), external system sensors (e.g., meteorological sensors (e.g., weather sensors, barometric pressure sensors, sunlight intensity sensors, wind speed sensors, humidity sensors, external temperature sensors (e.g., air temperature sensors, ground temperature sensors)), meters, or a combination thereof), gages, power sources (e.g., electrical circuits, electrical outlets, batteries, generators (e.g., power generators), or a combination thereof), electrodes, catalysts, flares (e.g., flare stacks), burners, controllers (e.g., digital controllers, analog controllers, mixed signal controllers, pneumatic controllers, hydraulic controllers, or a combination thereof), computing devices (e.g., which may include processors, memory, storage, antennas, ports, networking components, user input/output devices, or a combination thereof), antennas, wires, cables, networks (e.g., a local area network (LAN), wireless area network (WAN), the Internet, intranets (e.g., secure intranets), mobile networks, satellite networks, or a combination thereof), networking devices (e.g., routers, network switches, network air gap, or a combination thereof), accessories, some combination thereof, or the like. Additionally, while not necessarily described in detail with respect to FIGS. 2A-G, some or all of the plurality of stages and components thereof may be communicatively coupled to one another and/or controlled by communicatively coupled components of the system 200.

Figure 2A:
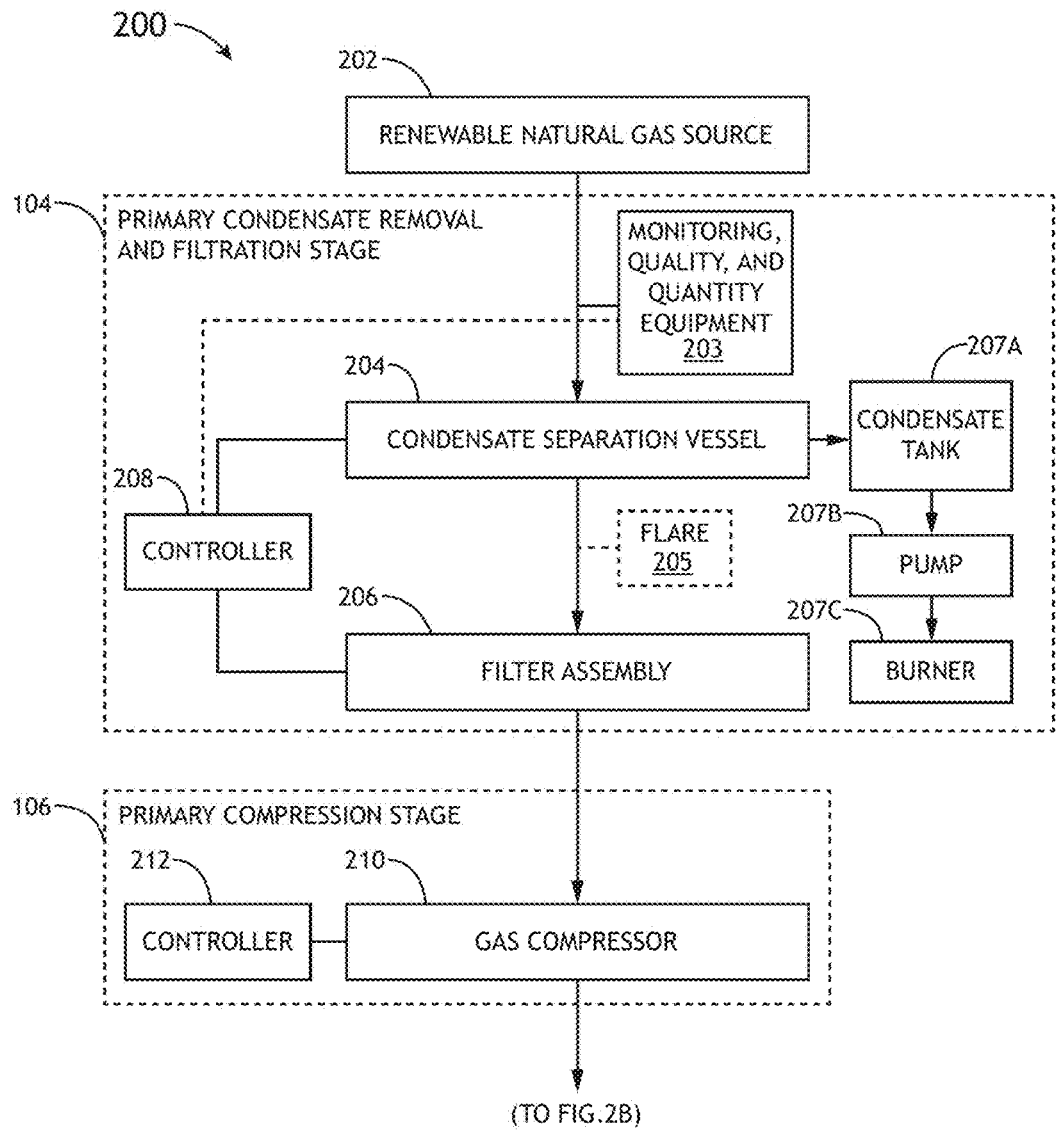
FIG. 2A is a partial view of an exemplary embodiment of a system of FIGS. 2A-G according to the inventive concepts disclosed herein.

Referring now to FIG. 2A, the system 200 includes a renewable natural gas source 202. The renewable natural gas source 202 may be configured to generate renewable natural gas (e.g., raw renewable natural gas) and/or provide (e.g., output, and/or supply) renewable natural gas to the primary condensate removal and filtration stage 104. The renewable natural gas source 202 may include or be implemented as any suitable source of renewable natural gas. In some embodiments, the renewable natural gas source 202 may be implemented as and/or include a landfill (e.g., a solid waste landfill (e.g., an MSW landfill); an active landfill or a closed landfill 102B (as shown in FIG. 1B)), a waste treatment plant (e.g., a WWTP 102C (as shown in FIG. 1C)), a waste facility (e.g., an agricultural waste facility 102D (as shown in FIG. 1D)), or a digestion facility (e.g., an organic waste digestion facility, such as a food waste digestion facility 102E (as shown in FIG. 1E)). In an exemplary embodiment, the renewable natural gas source 202 is a closed landfill 102.

The primary condensate removal and filtration stage 104 may include monitoring, quality, and quantity equipment 203, a condensate separation vessel 204, a flare 205, a filter assembly 206, a condensate tank 207A, a pump 207B, a burner 207C, and a controller 208.

In an exemplary embodiment, the monitoring, quality, and quantity equipment 203 may be coupled between the renewable natural gas source 202 and the condensate separation vessel 204. The monitoring, quality, and quantity equipment 203 may include any suitable components. For example, the monitoring, quality, and quantity equipment 203 may include one or more sensors (e.g., pressure sensors, temperature sensors, concentration sensors, flow sensors, spectrometers, instruments, external system sensors, sensors otherwise disclosed throughout, and/or a combination thereof), at least one controller, at least one computing device (which, for example, may include components of or similar to computing device 302 of FIG. 3), and/or a combination thereof. The monitoring, quality, and quantity equipment 203 may be configured to monitor and measure various characteristics, such as qualitative characteristics (e.g., methane purity level, impurity levels, chemical composition, and/or chemical component concentrations (e.g., methane concentration, carbon dioxide concentration, nitrogen concentration, oxygen concentration, hydrogen sulfide concentration, other organic compounds concentrations, and/or other trace component concentrations)) and/or quantitative characteristics (e.g., flow rate, temperature, and/or pressure), of the raw renewable natural gas being provided to the primary condensate removal and filtration stage 104. Additionally, the monitoring, quality, and quantity equipment 203 may be configured to communicate with (e.g., bidirectionally communicate; send and/or receive signals to and/or from as data) the controller 208, other controllers, at least one computing device (e.g., computing device 302 of FIG. 3), or the like. For example, the monitoring, quality, and quantity equipment 203 may be configured to exchange (e.g., send and/or receive) data associated with the monitored gas (e.g., the raw renewable natural gas) to the controller 208, other controllers, at least one computing device, and/or the like. For example, such sent data may be utilized by any of the controllers of the system 200 or the computing device 302 for controlling operation of one or more of the stages, individual components of one or more of the stages, or overall operation of the system 200. In some embodiments, the system 200's operation may be improved (e.g., optimized) based at least in part on data received from the monitoring, quality, and quantity equipment 203. While the monitoring, quality, and quantity equipment 203 is exemplarily depicted as monitoring characteristics of the incoming raw renewable natural gas, in some embodiments, the monitoring, quality, and quantity equipment 203 may be located in a different position of the stage 104, another stage, or elsewhere in the system 200. Further, while the monitoring, quality, and quantity equipment 203 is exemplarily depicted as monitoring characteristics of the incoming raw renewable natural gas, in some embodiments, any suitable number of additional monitoring, quality, and quantity equipment (e.g., similarly configured to the monitoring, quality, and quantity equipment 203) may be located in any suitable position of the stage 104, another stage, or elsewhere in the system 200, and such additional monitoring, quality, and quantity equipment may be configured to monitor and measure any suitable characteristics of the raw renewable natural gas, any of various intermediately processed gas, the refined biomethane gas 264, odorized refined biomethane gas, pipeline gas, CNG, and/or the like. For example, in some embodiments, a plurality of monitoring, quality, and quantity equipment (e.g., similarly configured to the monitoring, quality, and quantity equipment 203 and including at least some of the components of the monitoring, quality, and quantity equipment) may be positioned on gas lines and/or may be coupled to gas lines at the beginning and/or end of one, some, or all of the stages of the system 200. For example, in embodiments including a plurality of monitoring, quality, and quantity equipment positioned at various locations to measure gas characteristics at various positions of the system 200, the system 200's operation may be improved (e.g., optimized) based at least in part on data received from one or more of the plurality of monitoring, quality, and quantity equipment.

The condensate separation vessel 204 may include a gas/liquid separation vessel. For example, the condensate separation vessel 204 may be implemented as a below-grade condensate separation vessel; for example, a below-grade condensate separation vessel may utilize relatively cooler ground temperature (e.g., as compared to a temperature of the raw renewable natural gas) to cause a portion of the raw renewable natural gas to condense. In some embodiments, the condensate separation vessel 204 may be implemented as dehumidification vessels configured to at least partially dehumidify the raw renewable natural gas such as by causing water vapor and other impurities to condense and/to be captured in condensate. The condensate separation vessel 204 may be configured to separate liquid(s) (e.g., condensate) from the raw renewable natural gas. The condensate separation vessel 204 may be implemented as or include any suitable number of vessels. Additionally, the condensate separation vessel 204 may further include or be coupled with a pump system (not shown; e.g., which may include at least one (e.g., one, two, three, or more) controllable pump and/or controllable compressor, which may be controlled by a controller (e.g., 208)). For example, the pump system may be configured to provide the raw renewable natural gas (e.g., received from the renewable natural gas source 202) to the condensate separation vessel 204, provide liquid condensate to the condensate tank 207A, and provide a processed gas (e.g., condensate-separated renewable natural gas) to the filter assembly 206 and/or the flare 205.

The flare 205 may be implemented as or include any suitable flare or flare equipment. For example, the flare 205 may be implemented as a flare stack. In some embodiments, the flare 205 may be an auxiliary flare or backup flare. The flare 205 may be configured to combust and/or burn the raw renewable natural gas, the processed gas (e.g., intermediately processed gas, such as condensate-separated renewable natural gas), and/or the condensate. The flare 205 may be adjustable and/or controllable. The controller 208 may be configured to control (e.g., by activating, by deactivating, or by adjusting (e.g., increasing or decreasing) a flow rate through the flare 203). For example, the controller 208 may be configured to turn off the flare 203 when the renewable natural gas source refinement process is inactive (e.g., when a refined biomethane storage capacity is reached, when maintenance is being performed on any of various equipment associated with the renewable natural gas source refinement process, and/or during an emergency shutdown event). Such a flare 203 allows the system 200 to comply with various laws, rules, and regulations while the renewable natural gas source refinement process is inactive.

The filter assembly 206 may be implemented as or include any suitable type, number, size, and arrangement of filters. For example, the filter assembly 206 may be configured to filter out particulate matter from the processed gas (e.g., intermediately processed gas, such as condensate-separated renewable natural gas) received from the condensate separation vessel 204. For example, the filter assembly 206 may be implemented as one or more filter vessels, each of which includes one or more filters. In some embodiments, the filter assembly 206 includes a plurality of filters of the same or different size. In an exemplary embodiment, the filter assembly 206 includes at least one approximately 10 micron (e.g., +/−5 microns) filter.

In some embodiments, the primary condensate removal and filtration stage 104 may include a condensate destruction system. The condensate destruction system may be configured to safely destroy (e.g., by utilizing a combustion process) condensate removed from the condensate separation vessel 204. For example, the condensate destruction system may include the condensate tank 207A, the pump 207B, and the burner 207C. The condensate destruction system may be configured to store condensate received from the condensate separation vessel 204 in the condensate tank 207A. In some embodiments, the condensate tank 207A is also configured to receive and store other liquid waste (such as other liquid waste streams from other stages and/or other sources). The pump 207B may be configured to provide liquid (e.g., condensate) from the condensate tank 207A to the burner 207C. The burner 207C may be configured to utilize biogas (e.g., the raw renewable natural gas, intermediately processed gas (such as condensate-separated renewable natural gas), and/or the refined biomethane gas 264) to "burn off" (e.g., by utilizing a combustion process) liquid (e.g., the condensate) from the condensate tank 207A. A controller (e.g., 208) may be configured to control operation of the condensate destruction system and components thereof. In some embodiments, the burner 207C may be implemented as the flare 205 so that a separate burner is not necessary or may be omitted.

The controller 208 may be configured to control various components of the primary condensate removal and filtration stage 104. For example, the controller 208 may be configured to activate the primary condensate removal and filtration stage 104 and deactivate the primary condensate removal and filtration stage 104. Additionally, for example, the controller 208 may be configured to cause a flow of gas to bypass the primary condensate removal and filtration stage 104 and/or one or more components of the primary condensate removal and filtration stage 104. Further, for example, the controller 208 may be configured to independently and simultaneously control (e.g., activate, deactivate, and/or adjust operation of) one or more (e.g., one, some, or all) of the components of the primary condensate removal and filtration stage 104. Additionally, for example, the controller 208 may be configured to activate one or more components of the primary condensate removal and filtration stage 104 while other components of the primary condensate removal and filtration stage 104 are deactivated or in a reduced state of operation so as to improve (e.g., optimize) efficiency, functioning, and/or the like of the primary condensate removal and filtration stage 104 and/or the system 200. For example, when the primary condensate removal and filtration stage 104 is an activated state, the condensate separation vessel 204 and the filter assembly 206 may be in activated states, while the flare 205 may be in at least a reduced state (e.g., a deactivated state or a reduced state) such as by deactivating the flare or by reducing a flow of combustible gas to the flare 205.

While the primary condensate removal and filtration stage 104 exemplarily includes elements as shown, in some embodiments, one or more of the elements of the primary condensate removal and filtration stage 104 may be omitted, or the primary condensate removal and filtration stage 104 may include other elements. Additionally, while the primary condensate removal and filtration stage 104 is depicted as exemplarily having a particular arrangement and/or configuration of the depicted elements, other embodiments may include any number of elements of various types positioned anywhere in the primary condensate removal and filtration stage 104 and/or elsewhere in the system 200. Further, while the primary condensate removal and filtration stage 104 is depicted as exemplarily having a depicted number of elements, other embodiments may include any suitable number of elements of various suitable types positioned anywhere in the primary condensate removal and filtration stage 104 and/or the system 200.

Referring still to FIG. 2A, the primary compression stage 106 may include a gas compressor 210 and a controller 212.

The gas compressor 210 may include or be implemented as any suitable type of gas compressor. For example, in some embodiments, the gas compressor 210 may be implemented as a screw compressor. The gas compressor 210 may be configured to receive processed gas from the filter assembly 206 and/or the primary condensate removal and filtration stage 104, compress such received gas, and output the compressed gas to the heat transfer stage 108.

The controller 212 may be implemented similarly to the controller 208 except that the controller 212 may be configured to control the primary compression stage 106 and/or components thereof. For example, the controller 212 may be configured to control the output pressure of the gas from the compressor (e.g., 210).

While the primary compression stage 106 exemplarily includes elements as shown, in some embodiments, one or more of the elements of the primary compression stage 106 may be omitted, or the primary compression stage 106 may include other elements. Additionally, while the primary compression stage 106 is depicted as exemplarily having a particular arrangement and/or configuration of the depicted elements, other embodiments may include any number of elements of various types positioned anywhere in the primary compression stage 106 and/or elsewhere in the system 200. Further, while the primary compression stage 106 is depicted as exemplarily having a depicted number of elements, other embodiments may include any suitable number of elements of various suitable types positioned anywhere in the primary compression stage 106 and/or the system 200.

Figure 2B:
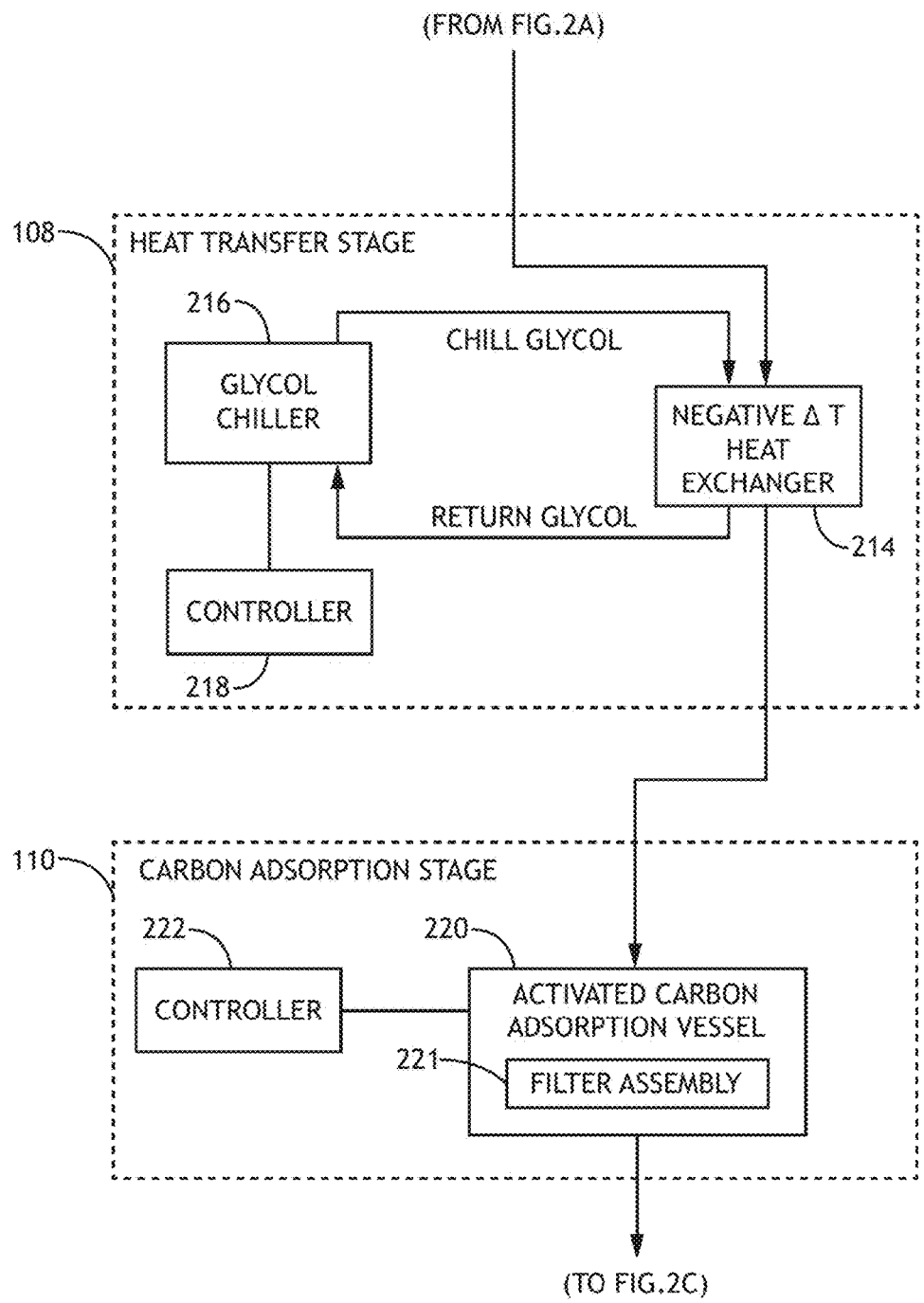
FIG. 2B is a partial view of the system of FIGS. 2A-G according to the inventive concepts disclosed herein.

Referring now to FIG. 2B, the heat transfer stage 108 may include a heat exchanger (e.g., a negative temperature change heat exchanger 214), a fluid loop (e.g., a closed fluid loop; e.g., a chilled glycol supply line and a glycol return line), a chiller (e.g., a glycol chiller 216), and a controller 218.

The heat exchanger (e.g., the negative temperature change heat exchanger 214) may include or be implemented as any suitable type of heat exchanger. For example, in some embodiments, the heat exchanger may be implemented as a plate and frame heat exchanger, such as a gas/liquid plate and frame heat exchanger. For example, the heat exchanger may be configured to receive a flow of processed gas from the gas compressor 210 and/or the primary compressor stage 106, receive a flow of a chilled fluid (e.g., chilled glycol) from the chiller (e.g., the glycol chiller 216), transfer heat from the received flow of processed gas to the received flow of chilled fluid, output a flow of the processed gas as a chilled processed gas to the carbon adsorption stage 110, and output a flow of the return fluid to the chiller.

The chiller (e.g., the glycol chiller 216) may be may include or be implemented as any suitable type of chiller. For example, the chiller may be implemented as a closed-loop chiller. The chiller may be coupled to a chilled fluid supply line (e.g., a chilled glycol supply line) and a return line (e.g., a glycol return line) of a closed fluid loop, which is coupled to the heat exchanger. The chiller may be configured to receive a flow of fluid via the return line, chill received fluid, and output a flow of chilled fluid through the chilled fluid supply line so as to be supplied to the heat exchanger. The chiller may include or be coupled to one or more pumps. While some embodiments are exemplarily described as including a chiller, in other embodiments, the chiller may be substituted with or augmented with any suitable heat sink (e.g., a heat pump, such as a below-grade heat pump or an underwater heat pump). In some embodiments, the fluid chilled by the chiller includes a mixture of glycol and water. While exemplary embodiments are described as including glycol, some embodiments may include any suitable fluid.

The controller 218 may be implemented similarly to the controller 208 except that the controller 218 may be configured to control the heat transfer stage 108 and/or components thereof. For example, the controller 218 may be configured to control the output temperature of the gas from the heat exchanger (e.g., 214) by controlling a flow rate of the chilled fluid (e.g., chilled fluid from the chiller (e.g., 216)) and/or the flow rate of the processed gas through the heat exchanger (e.g., 214) based at least on fluid properties (e.g., pressure, temperature, density, and/or composition) of the influent processed gas and the influent chilled fluid supplied to the heat exchanger (e.g., 214).

While the heat transfer stage 108 exemplarily includes elements as shown, in some embodiments, one or more of the elements of the heat transfer stage 108 may be omitted, or the heat transfer stage 108 may include other elements. For example, in some embodiments, the heat transfer stage 108 may include a heat pump or a thermoelectric heat pump (e.g., a thermoelectric refrigerator). Additionally, while the heat transfer stage 108 is depicted as exemplarily having a particular arrangement and/or configuration of the depicted elements, other embodiments may include any number of elements of various types positioned anywhere in the heat transfer stage 108 and/or elsewhere in the system 200. Further, while the heat transfer stage 108 is depicted as exemplarily having a depicted number of elements, other embodiments may include any suitable number of elements of various suitable types positioned anywhere in the heat transfer stage 108 and/or the system 200.

Referring still to FIG. 2B, the carbon adsorption stage 108 may include a carbon adsorption vessel (e.g., an activated carbon adsorption vessel 220) and a controller 222.

The carbon adsorption vessel (e.g., an activated carbon adsorption vessel 220) may include or be implemented as any suitable type of carbon adsorption vessel. For example, the carbon adsorption vessel may include a filter assembly 221. For example, the filter assembly 221 may include one or more filters of same or different types. For example, each of the filters may include or may be implemented as a molecular sieve bed. The carbon adsorption vessel and/or the filter assembly 221 may be configured to receive processed gas from the heat transfer stage 108 and/or the heat exchanger (e.g., the negative temperature change heat exchanger 214). The carbon adsorption vessel and/or the filter assembly 221 may be further configured to further process the received gas by filtering out (e.g., via one or more adsorption processes (e.g., one or more pressure swing adsorption (PSA) processes)) various types of molecules from such received gas. For example, the carbon adsorption vessel and/or the filter assembly 221 may be configured to filter out, by utilizing one or more adsorption processes (e.g., one or more pressure swing adsorption (PSA) processes), hydrogen sulfide ($H_2S$), at least some VOCs, and/or at least some organosilicons (e.g., at least some siloxanes) from the received gas. The carbon adsorption vessel may be configured to provide processed gas to the positive temperature change heat transfer stage 211.

The controller 222 may be implemented similarly to the controller 208 except that the controller 222 may be configured to control the carbon adsorption stage 108 and/or components thereof.

While the carbon adsorption stage 108 exemplarily includes elements as shown, in some embodiments, one or more of the elements of the carbon adsorption stage 108 may be omitted, or the carbon adsorption stage 108 may include other elements. Additionally, while the carbon adsorption stage 108 is depicted as exemplarily having a particular arrangement and/or configuration of the depicted elements, other embodiments may include any number of elements of various types positioned anywhere in the carbon adsorption stage 108 and/or elsewhere in the system 200. Further, while the carbon adsorption stage 108 is depicted as exemplarily having a depicted number of elements, other embodiments may include any suitable number of elements of various suitable types positioned anywhere in the carbon adsorption stage 108 and/or the system 200.

Figure 2C:
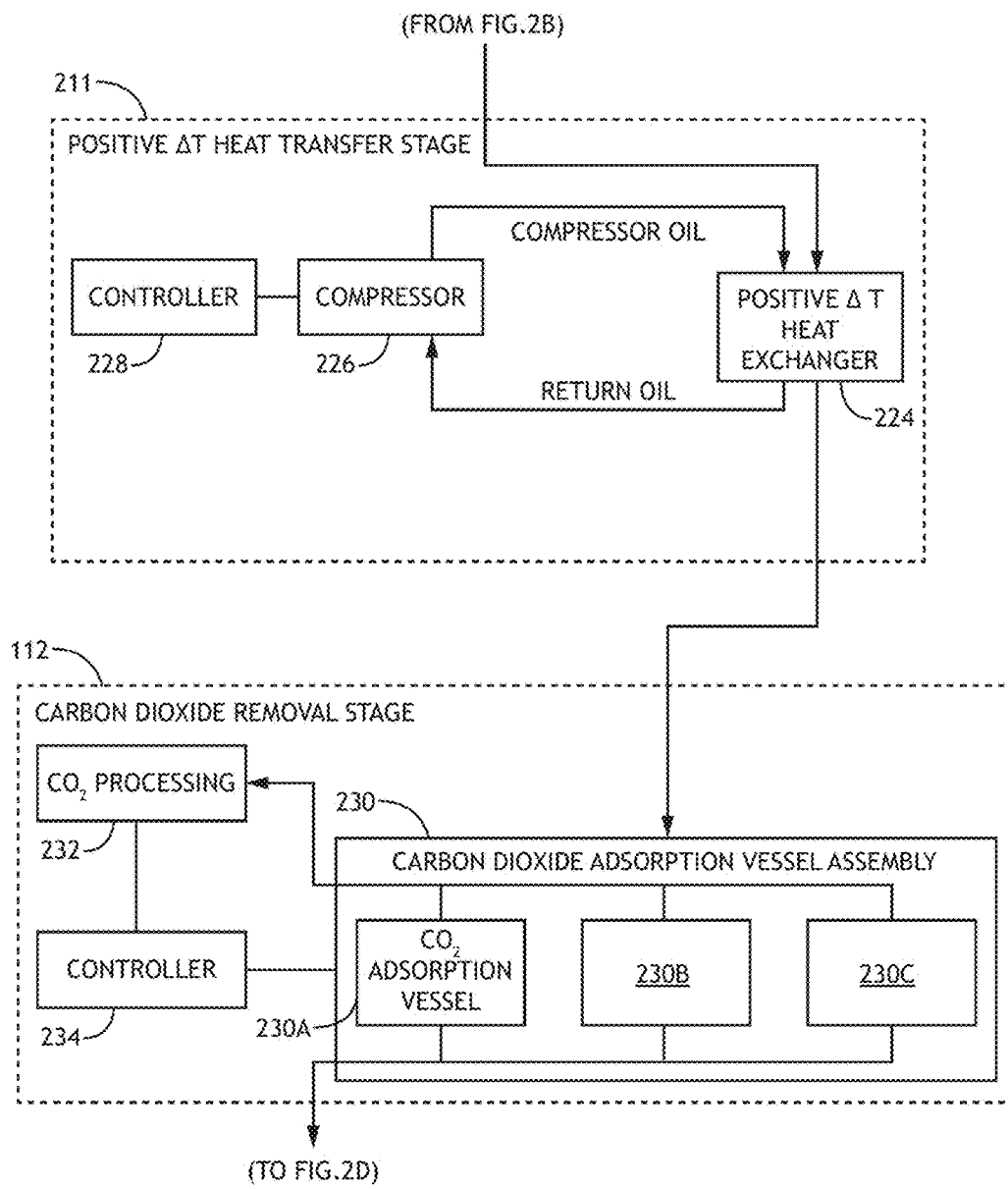
FIG. 2C is a partial view of the system of FIGS. 2A-G according to the inventive concepts disclosed herein.

Referring now to FIG. 2C, a heat transfer stage (e.g., the positive temperature change heat transfer stage 211) may include a heat exchanger (e.g., a positive temperature change heat exchanger 224), a fluid loop (e.g., a closed fluid loop; e.g., a heated oil supply line and a return oil line), a heat source (e.g., a compressor 226), and a controller 228.

The heat exchanger (e.g., the positive temperature change heat transfer stage 211) may include or be implemented as any suitable type of heat exchanger. For example, in some embodiments, the heat exchanger may be implemented as a plate and frame heat exchanger, such as a gas/liquid plate and frame heat exchanger. For example, the heat exchanger may be configured to receive a flow of processed gas from the carbon adsorption vessel and/or the carbon adsorption stage 110, receive a flow of a heated fluid (e.g., from one or more heat sources, such as at least one compressor (e.g., 210, 226, 236, 246, and/or 256)) from one or more heat sources, transfer heat to the received flow of processed gas from the received flow of heated fluid, output a flow of the processed gas as a heated processed gas to the carbon dioxide removal stage, and output a flow of the return fluid to the one or more heat sources.

The one or more heat sources (e.g., a compressor 210, 226, 236, 246, and/or 256) may include or be implemented as any suitable type of heat source (e.g., equipment or apparatus which captures, produces, and/or provides heat; a heater; a boiler; a solar heater; and/or a heat pump). For example, a heat source may be implemented as the compressor 226. The compressor 226 may be coupled to a heated fluid supply line (e.g., a heated compressor oil supply line) and a return line (e.g., an oil return line) of a closed fluid loop, which is coupled to the heat exchanger (e.g., 224). The compressor 226 may be configured to receive a flow of fluid via the return line, heat received fluid, and output a flow of heated fluid through the heated fluid supply line so as to be supplied to the heat exchanger (e.g., 224). The compressor 226 may include or be coupled to one or more pumps. While some embodiments are exemplarily described as including the compressor 226, in other embodiments, the compressor 226 may be substituted with or augmented with any suitable heat source, such as another compressor or heat producing equipment of the system 200. In some embodiments, the fluid heated by the heat source may include any suitable fluid (such as heated water and/or heated steam,).

The controller 228 may be implemented similarly to the controller 208 except that the controller 228 may be configured to control the heat transfer stage (e.g., the positive temperature heat transfer stage 211) and/or components thereof. For example, the controller 228 may be configured to control the output temperature of the gas from the heat exchanger (e.g., 224) by controlling a flow rate of the heated fluid (e.g., heated oil from the compressor (e.g., 226)) and/or the flow rate of the processed gas through the heat exchanger (e.g., 224) based at least on fluid properties (e.g., pressure, temperature, density, and/or composition) of the influent processed gas and the influent heated oil supplied to the heat exchanger (e.g., 224).

While the positive temperature change heat transfer stage 211 exemplarily includes elements as shown, in some embodiments, one or more of the elements of the positive temperature change heat transfer stage 211 may be omitted, or the positive temperature change heat transfer stage 211 may include other elements. For example, in some embodiments, the heat transfer stage 108 may include a heat pump or a thermoelectric heat pump (e.g., a thermoelectric heater). Additionally, while the positive temperature change heat transfer stage 211 is depicted as exemplarily having a particular arrangement and/or configuration of the depicted elements, other embodiments may include any number of elements of various types positioned anywhere in the positive temperature change heat transfer stage 211 and/or elsewhere in the system 200. Further, while the positive temperature change heat transfer stage 211 is depicted as exemplarily having a depicted number of elements, other embodiments may include any suitable number of elements of various suitable types positioned anywhere in the positive temperature change heat transfer stage 211 and/or the system 200.

Referring still to FIG. 2C, the carbon dioxide removal stage 112 may include a carbon dioxide adsorption vessel assembly 230, a carbon dioxide processing stage 232, and a controller 234.

The carbon dioxide adsorption vessel assembly 230 may include one or more carbon dioxide adsorption vessels (e.g., 230A, 230B, and 230C). For example, the carbon dioxide adsorption vessels (e.g., 230A, 230B, and 230C) may be arranged and configured to receive gas from the positive temperature change heat transfer stage 211 in parallel, output carbon dioxide to the carbon dioxide processing stage 232 in parallel, and output carbon-dioxide-removed gas in parallel (which may be supplied to the first recompression stage 116A). For example, each of the carbon dioxide adsorption vessels (e.g., 230A, 230B, and 230C) may include one or more filters of same or different types. For example, each of such filters may include or may be implemented as a molecular sieve bed (e.g., activated alumina media beds) configured to remove carbon dioxide. Each of the carbon dioxide adsorption vessels (e.g., 230A, 230B, and 230C)

may be configured to receive gas from the positive temperature change heat transfer stage 211. Each of the carbon dioxide adsorption vessels (e.g., 230A, 230B, and 230C) may be further configured to further process the received gas by filtering out (e.g., via one or more adsorption processes (e.g., one or more pressure swing adsorption (PSA) processes)) carbon dioxide molecules from such received gas. Each of the carbon dioxide adsorption vessels (e.g., 230A, 230B, and 230C) may be further configured to provide processed gas (e.g., carbon-dioxide-removed gas) to the first recompression stage 116A.

The controller 234 may be implemented similarly to the controller 208 except that the controller 234 may be configured to control the carbon dioxide removal stage 112 and/or components thereof.

While the carbon dioxide removal stage 112 exemplarily includes elements as shown, in some embodiments, one or more of the elements of the carbon dioxide removal stage 112 may be omitted, or the carbon dioxide removal stage 112 may include other elements. Additionally, while the carbon dioxide removal stage 112 is depicted as exemplarily having a particular arrangement and/or configuration of the depicted elements, other embodiments may include any number of elements of various types positioned anywhere in the carbon dioxide removal stage 112 and/or elsewhere in the system 200. Further, while the carbon dioxide removal stage 112 is depicted as exemplarily having a depicted number of elements, other embodiments may include any suitable number of elements of various suitable types positioned anywhere in the carbon dioxide removal stage 112 and/or the system 200.

Figure 2D:
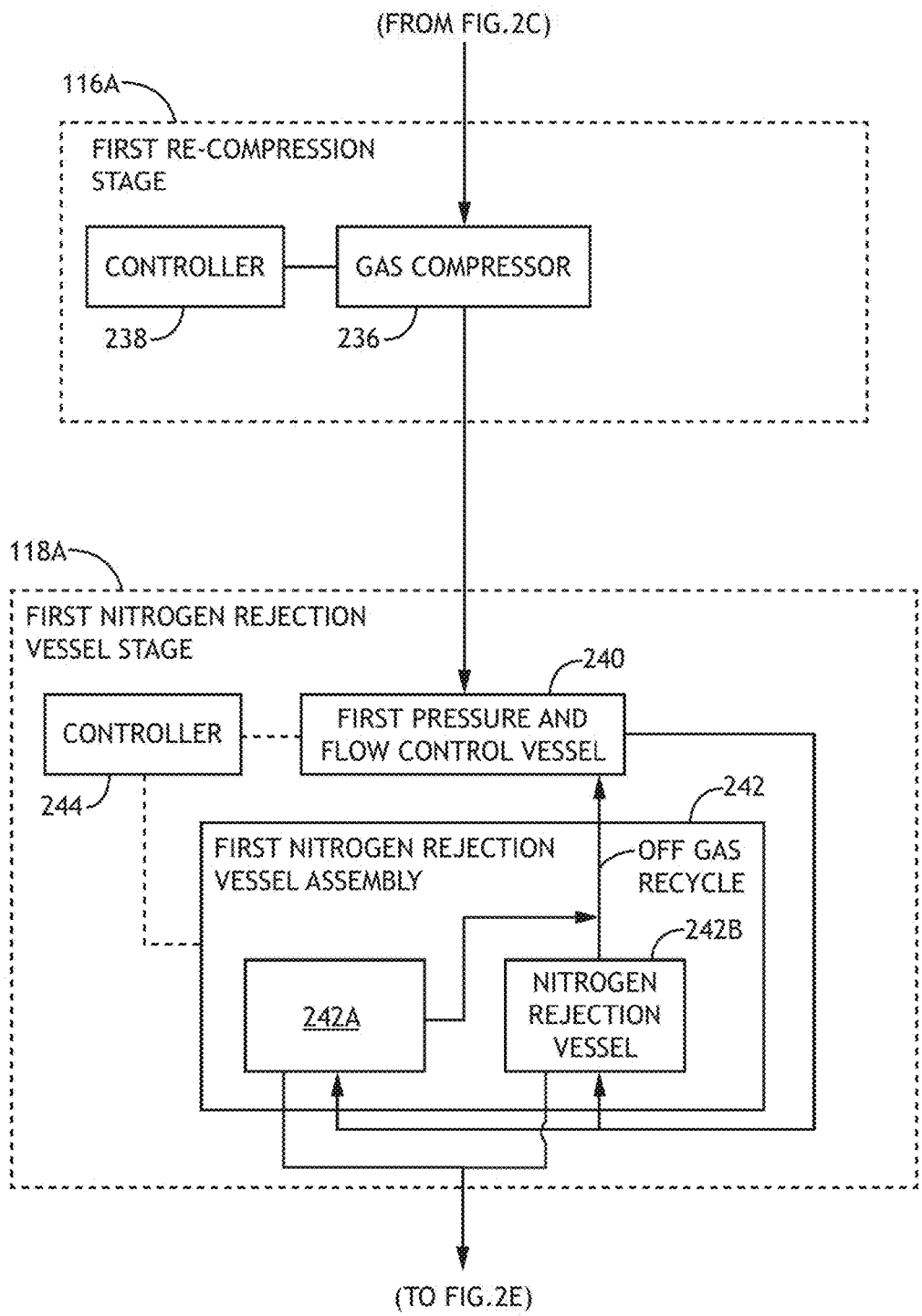
FIG. 2D is a partial view of the system of FIGS. 2A-G according to the inventive concepts disclosed herein.

Referring now to FIG. 2D, the first recompression stage 116A may include a gas compressor 236 and a controller 238.

The gas compressor 236 may include or be implemented as any suitable type of gas compressor. For example, in some embodiments, the gas compressor 236 may be implemented as a screw compressor. The gas compressor 236 may be configured to receive processed gas (e.g., carbon-dioxide-removed gas) from the carbon dioxide removal stage 112, compress such received gas, and output the compressed gas to the first nitrogen rejection vessel stage 118A.

The controller 238 may be implemented similarly to the controller 208 except that the controller 238 may be configured to control the first recompression stage 116A and/or components thereof. For example, the controller 238 may be configured to control the output pressure of the gas from the compressor (e.g., 236).

While the first recompression stage 116A exemplarily includes elements as shown, in some embodiments, one or more of the elements of the first recompression stage 116A may be omitted, or the primary compression stage 106 may include other elements. Additionally, while the first recompression stage 116A is depicted as exemplarily having a particular arrangement and/or configuration of the depicted elements, other embodiments may include any number of elements of various types positioned anywhere in the first recompression stage 116A and/or elsewhere in the system 200. Further, while the first recompression stage 116A is depicted as exemplarily having a depicted number of elements, other embodiments may include any suitable number of elements of various suitable types positioned anywhere in the first recompression stage 116A and/or the system 200.

Referring still to FIG. 2D, the first nitrogen rejection vessel stage 118A may include a first pressure and flow control vessel 240, a first nitrogen rejection vessel assembly 242, and a controller 244.

The first pressure and flow control vessel 240 may be implemented as and/or include any suitable vessel. For example, the first pressure and flow control vessel 240 may be implemented as and/or include a tank (e.g., an expansion tank). In some embodiments, the first pressure and flow control vessel 240 may be configured to receive influent gas flows from the gas compressor 236 and from the first nitrogen rejection vessel assembly 242 via the off-gas recycle line; however, in other embodiments, the off-gas recycle line may be omitted. In some embodiments, the gas the first pressure and flow control vessel 240 may be configured to allow a flow of gas (e.g., gas received from the gas compressor 236; or a mixture of gas received from the gas compressor 236 and gas received from the first nitrogen rejection vessel assembly 242 via the off-gas recycle line) to the first nitrogen rejection vessel assembly 242.

The first nitrogen rejection vessel assembly 242 may include one or more nitrogen rejection vessels (e.g., 242A and 242B). For example, the nitrogen rejection vessels (e.g., 242A and 242B) may be arranged and configured to receive gas from the first pressure and flow control vessel 240 in parallel, output rejected nitrogen-containing gas (e.g., gaseous nitrogen ($N_2$) and/or ammonia), output recycled off-gas in parallel to the first pressure and flow control vessel 240 in parallel, and/or output nitrogen-removed gas in parallel (which may be supplied to the second recompression stage 116B). In some embodiments, at least some of the nitrogen-containing gas (e.g., gaseous nitrogen ($N_2$)) may be released into the atmosphere. For example, each of the nitrogen rejection vessels (e.g., 242A and 242B) may include one or more filters of same or different types. For example, each of such filters may include or may be implemented as a molecular sieve bed (e.g., an activated carbon media bed) configured to remove nitrogen-containing gas (e.g., gaseous nitrogen ($N_2$) and/or ammonia). Each of the nitrogen rejection vessels (e.g., 242A and 242B) may be configured to receive gas from the first pressure and flow control vessel 240. Each of the nitrogen rejection vessels (e.g., 242A and 242B) may be further configured to further process the received gas by filtering out (e.g., via one or more adsorption processes (e.g., one or more pressure swing adsorption (PSA) processes)) nitrogen-containing gas (e.g., gaseous nitrogen ($N_2$) and/or ammonia) from such received gas. Each of the nitrogen rejection vessels (e.g., 242A and 242B) may be further configured to provide processed gas (e.g., nitrogen-removed gas) to the second recompression stage 116B.

In some embodiments, the off-gas recycle line includes one or more (e.g., two or more) check valves and a compressor.

The controller 244 may be implemented similarly to the controller 208 except that the controller 244 may be configured to control the first nitrogen rejection vessel stage 118A and/or components thereof.

While the first nitrogen rejection vessel stage 118A exemplarily includes elements as shown, in some embodiments, one or more of the elements of the first nitrogen rejection vessel stage 118A may be omitted, or the first nitrogen rejection vessel stage 118A may include other elements. Additionally, while the first nitrogen rejection vessel stage 118A is depicted as exemplarily having a particular arrangement and/or configuration of the depicted elements, other embodiments may include any number of elements of various types positioned anywhere in the first nitrogen rejection vessel stage 118A and/or elsewhere in the system 200. Further, while the first nitrogen rejection vessel stage 118A is depicted as exemplarily having a depicted number of elements, other embodiments may include any suitable number of elements of various suitable types positioned anywhere in the first nitrogen rejection vessel stage 118A and/or the system 200.

Figure 2E:
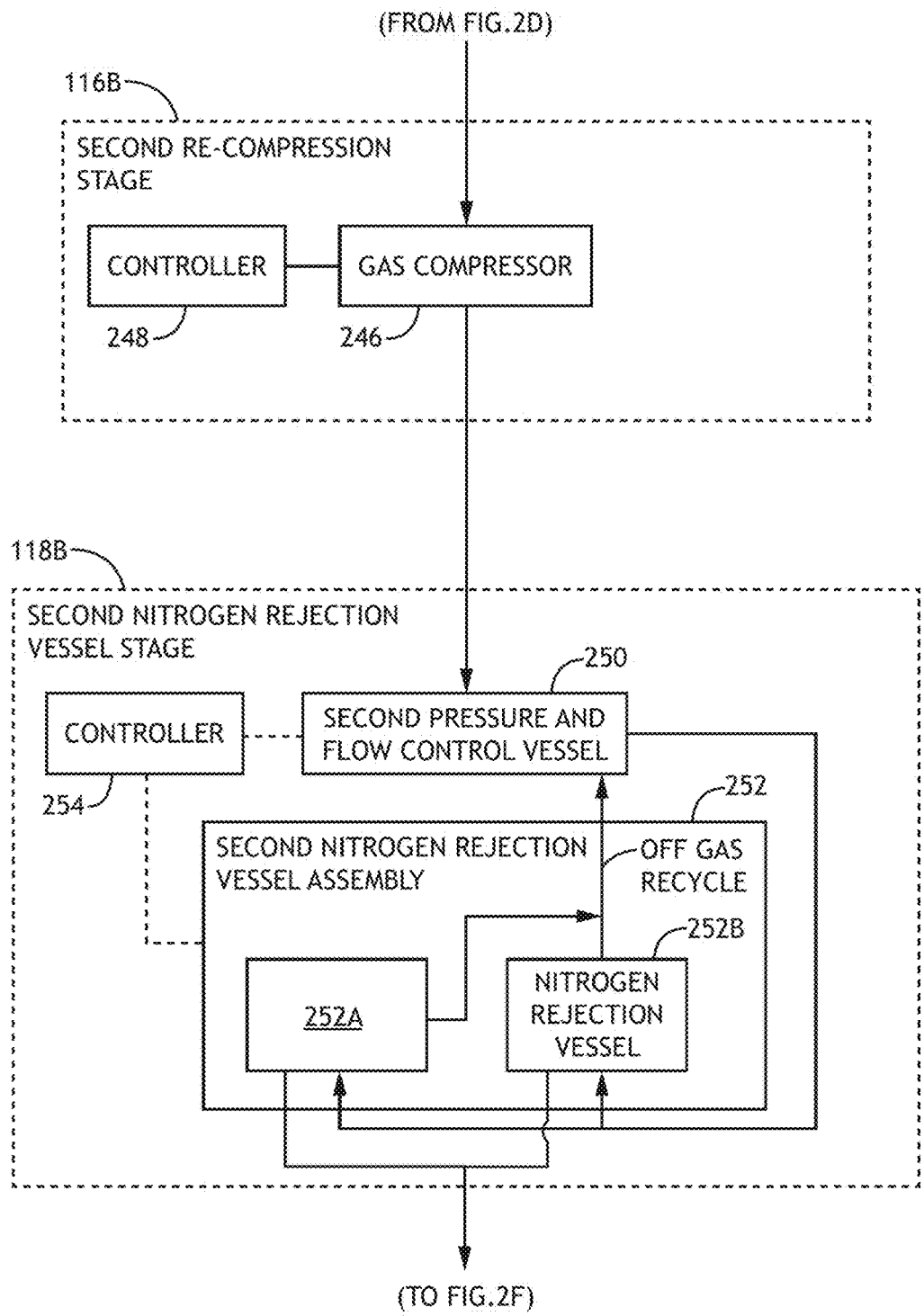
FIG. 2E is a partial view of the system of FIGS. 2A-G according to the inventive concepts disclosed herein.

Referring now to FIG. 2E, the second recompression stage 116B may include a gas compressor 246 and a controller 248.

The gas compressor 246 may include or be implemented as any suitable type of gas compressor. For example, in some embodiments, the gas compressor 246 may be implemented as a screw compressor. The gas compressor 246 may be configured to receive processed gas (e.g., carbon-dioxide-removed gas) from the first nitrogen rejection vessel stage 118A, compress such received gas, and output the compressed gas to the second nitrogen rejection vessel stage 118B.

The controller 248 may be implemented similarly to the controller 208 except that the controller 248 may be configured to control the second recompression stage 116B and/or components thereof. For example, the controller 248 may be configured to control the output pressure of the gas from the compressor (e.g., 246).

While the second recompression stage 116B exemplarily includes elements as shown, in some embodiments, one or more of the elements of the second recompression stage 116B may be omitted, or the second recompression stage 116B may include other elements. Additionally, while the second recompression stage 116B is depicted as exemplarily having a particular arrangement and/or configuration of the depicted elements, other embodiments may include any number of elements of various types positioned anywhere in the first second recompression stage 116B and/or elsewhere in the system 200. Further, while the second recompression stage 116B is depicted as exemplarily having a depicted number of elements, other embodiments may include any suitable number of elements of various suitable types positioned anywhere in the second recompression stage 116B and/or the system 200.

Referring still to FIG. 2E, the second nitrogen rejection vessel stage 118B may include a second pressure and flow control vessel 250, a second nitrogen rejection vessel assembly 252, and a controller 254.

The second pressure and flow control vessel 250 may be implemented as and/or include any suitable vessel. For example, the second pressure and flow control vessel 250 may be implemented as and/or include a tank (e.g., an expansion tank). In some embodiments, the second pressure and flow control vessel 250 may be configured to receive influent gas flows from the gas compressor 246 and from the second nitrogen rejection vessel assembly 252 via an off-gas recycle line; however, in other embodiments, the off-gas recycle line may be omitted. In some embodiments, the second pressure and flow control vessel 250 may be configured to allow a flow of gas (e.g., gas received from the gas compressor 246; or a mixture of gas received from the gas compressor 246 and gas received from the second nitrogen rejection vessel assembly 252 via the off-gas recycle line) to the second nitrogen rejection vessel assembly 252.

The second nitrogen rejection vessel assembly 252 may include one or more nitrogen rejection vessels (e.g., 252A and 252B). For example, the nitrogen rejection vessels (e.g., 252A and 252B) may be arranged and configured to receive gas from the second pressure and flow control vessel 250 in parallel, output rejected nitrogen-containing gas (e.g., gaseous nitrogen ($N_2$) and/or ammonia), output recycled off-gas in parallel to the second pressure and flow control vessel 250 in parallel, and/or output nitrogen-removed gas in parallel (which may be supplied to the final compression stage 122). In some embodiments, at least some of the nitrogen-containing gas (e.g., gaseous nitrogen ($N_2$)) may be released into the atmosphere. For example, each of the nitrogen rejection vessels (e.g., 252A and 252B) may include one or more filters of same or different types. For example, each of such filters may include or may be implemented as a molecular sieve bed configured to remove nitrogen-containing gas (e.g., gaseous nitrogen ($N_2$) and/or ammonia). Each of the nitrogen rejection vessels (e.g., 252A and 252B) may be configured to receive gas from the second pressure and flow control vessel 250. Each of the nitrogen rejection vessels (e.g., 252A and 252B) may be further configured to further process the received gas by filtering out (e.g., via one or more adsorption processes (e.g., one or more pressure swing adsorption (PSA) processes)) nitrogen-containing gas (e.g., gaseous nitrogen ($N_2$) and/or ammonia) from such received gas. Each of the nitrogen rejection vessels (e.g., 252A and 252B) may be further configured to provide processed gas (e.g., nitrogen-removed gas) to the final compression stage 122.

In some embodiments, the off-gas recycle line includes one or more (e.g., two or more) check valves and a compressor.

The controller 254 may be implemented similarly to the controller 208 except that the controller 254 may be configured to control the second nitrogen rejection vessel stage 118B and/or components thereof.

While the second nitrogen rejection vessel stage 118B exemplarily includes elements as shown, in some embodiments, one or more of the elements of the second nitrogen rejection vessel stage 118B may be omitted, or the second nitrogen rejection vessel stage 118B may include other elements. Additionally, while the second nitrogen rejection vessel stage 118B is depicted as exemplarily having a particular arrangement and/or configuration of the depicted elements, other embodiments may include any number of elements of various types positioned anywhere in the second nitrogen rejection vessel stage 118B and/or elsewhere in the system 200. Further, while the second nitrogen rejection vessel stage 118B is depicted as exemplarily having a depicted number of elements, other embodiments may include any suitable number of elements of various suitable types positioned anywhere in the second nitrogen rejection vessel stage 118B and/or the system 200.

Figure 2F:
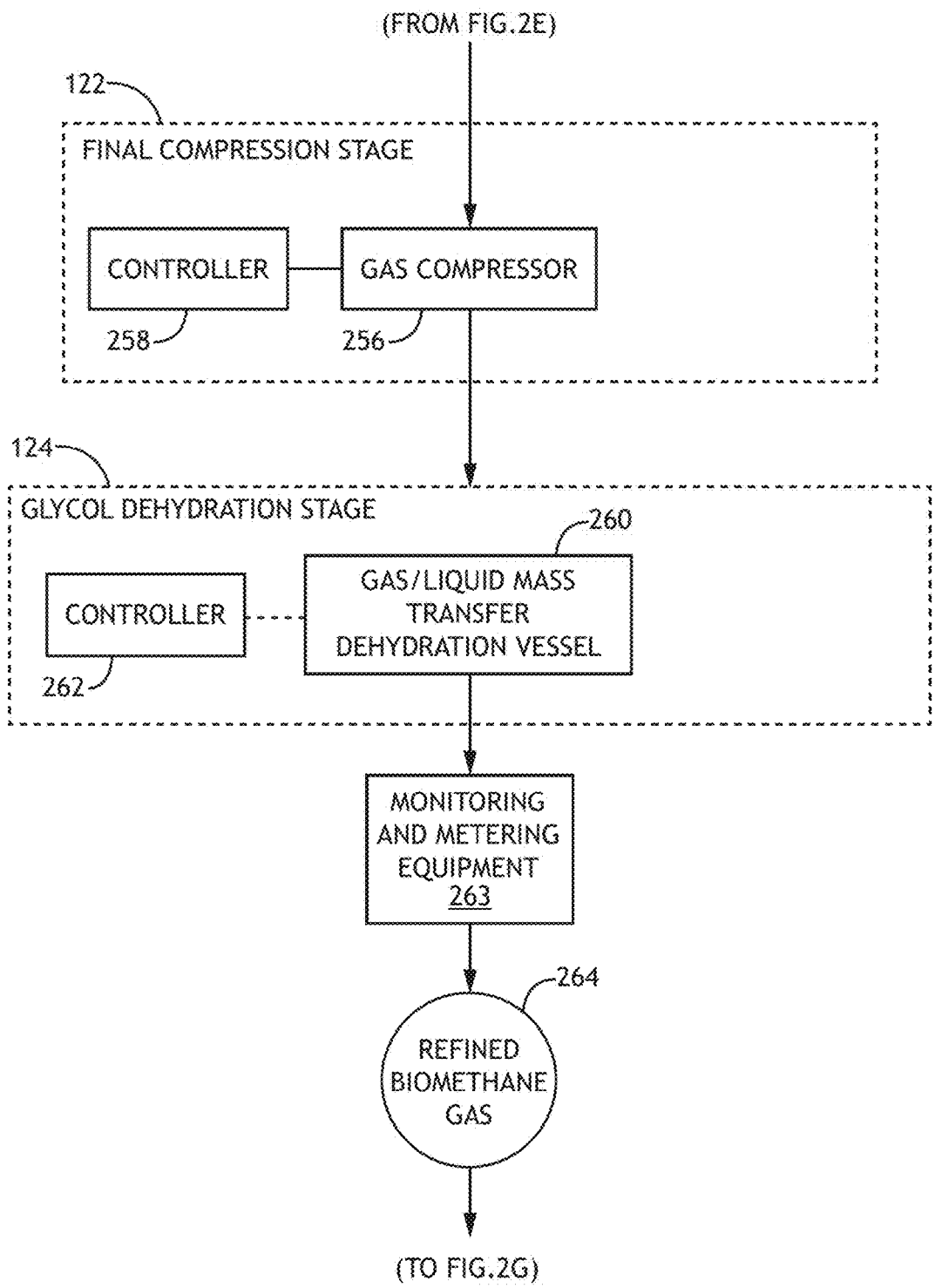
FIG. 2F is a partial view of the system of FIGS. 2A-G according to the inventive concepts disclosed herein.

Referring now to FIG. 2F, a compression stage (e.g., the final compression stage 122) may include a gas compressor 256 and a controller 258.

The gas compressor 256 may include or be implemented as any suitable type of gas compressor. For example, in some embodiments, the gas compressor 256 may be implemented as a reciprocating compressor or a rotary compressor. The gas compressor 256 may be configured to receive processed gas from the second nitrogen rejection vessel stage 118B, compress such received gas, and output the compressed gas to the glycol dehydration stage 124.

The controller 258 may be implemented similarly to the controller 208 except that the controller 258 may be configured to control the primary compression stage 106 and/or components thereof. For example, the controller 212 may be configured to control the output pressure(s) and/or compressor cycle frequency of the gas from the gas compressor 256.

While the final compression stage 122 exemplarily includes elements as shown, in some embodiments, one or more of the elements of the final compression stage 122 may be omitted, or the final compression stage 122 may include other elements. Additionally, while the final compression stage 122 is depicted as exemplarily having a particular arrangement and/or configuration of the depicted elements, other embodiments may include any number of elements of various types positioned anywhere in the final compression stage 122 and/or elsewhere in the system 200. Further, while the final compression stage 122 is depicted as exemplarily having a depicted number of elements, other embodiments may include any suitable number of elements of various suitable types positioned anywhere in the final compression stage 122 and/or the system 200.

Referring still to FIG. 2F, a dehydration stage (e.g., the glycol dehydration stage 124) may include a dehydration vessel (e.g., a gas/liquid mass transfer dehydration vessel 260) and a controller 262.

The dehydration vessel (e.g., the gas/liquid mass transfer dehydration vessel 260) may include or be implemented as any suitable type of dehydration vessel. For example, in some embodiments, the dehydration vessel may include glycol such that when the compressed gas from the final compression stage 122 passes through the dehydration vessel, the glycol in the dehydration vessel removes or separates at least a significant portion (e.g., some, a majority, and/or substantially all) of any remaining moisture (e.g., water vapor) from the compressed gas so as to output the refined biomethane gas 264 from the dehydration vessel. For example, in some embodiments, the gas/liquid mass transfer dehydration vessel 260 may be implemented as a mass transfer column (e.g., pressure packed mass transfer column (e.g., a pressure packed mass transfer glycol column; e.g., mass transfer glycol column). The dehydration vessel may be configured to receive compressed gas from the final compression stage 122, remove moisture from the received gas, and output the refined biomethane gas 264 to the gas odorization equipment 266.

The controller 262 may be implemented similarly to the controller 208 except that the controller 262 may be configured to control the dehydration stage (e.g., the glycol dehydration stage 124) and/or components thereof. For example, the controller 262 may be configured to control the moisture content of the refined biomethane gas 264 outflow from the dehydration vessel. For example, the controller 262 may be configured to control the moisture content of the refined biomethane gas 264 so that the refined biomethane gas 264's moisture content is less than or equal to a predetermined threshold moisture content level or within a predetermined target range of moisture content levels.

While the dehydration stage (e.g., the glycol dehydration stage 124) exemplarily includes elements as shown, in some embodiments, one or more of the elements of the dehydration stage may be omitted, or the dehydration stage may include other elements. Additionally, while the dehydration stage is depicted as exemplarily having a particular arrangement and/or configuration of the depicted elements, other embodiments may include any number of elements of various types positioned anywhere in the dehydration stage and/or elsewhere in the system 200. Further, while the dehydration stage is depicted as exemplarily having a depicted number of elements, other embodiments may include any suitable number of elements of various suitable types positioned anywhere in the dehydration stage and/or the system 200.

The monitoring and metering equipment 263 may be implemented similarly to the monitoring, quality, and quantity equipment 203 and/or include components of the monitoring, quality, and quantity equipment 203, except that, for example, the monitoring and metering equipment 263 measure characteristics of the refined biomethane gas 264. For example, the monitoring and metering equipment 263 may be configured to monitor at least one qualitative characteristic (e.g., a purity and/or chemical composition) of the refined biomethane gas 264 and/or meter, such as via a meter, an amount of produced refined biomethane gas 264. Further, while the monitoring and metering equipment 263 is exemplarily depicted as monitoring characteristics of the incoming raw renewable natural gas, in some embodiments, any suitable number of additional monitoring and metering equipment 263 (e.g., similarly configured to the monitoring and metering equipment 263) may be located in any suitable position of the system 200, and such additional monitoring and metering equipment may be configured to monitor and measure any suitable characteristics of the raw renewable natural gas, any of various intermediately processed gas, the refined biomethane gas 264, odorized refined biomethane gas, pipeline gas, CNG, and/or the like. For example, in some embodiments, a plurality of monitoring and metering equipment (e.g., similarly configured to the monitoring and metering equipment 263 and including at least some of the components of the monitoring and metering equipment 263) may be positioned on gas lines and/or may be coupled to gas lines at the beginning and/or end of one, some, or all of the stages of the system 200. For example, in embodiments including a plurality of monitoring and metering equipment positioned at various locations to measure gas characteristics at various positions of the system 200, the system 200's operation may be improved (e.g., optimized) based at least in part on data received from one or more of the plurality of monitoring and metering equipment.

Figure 2G:
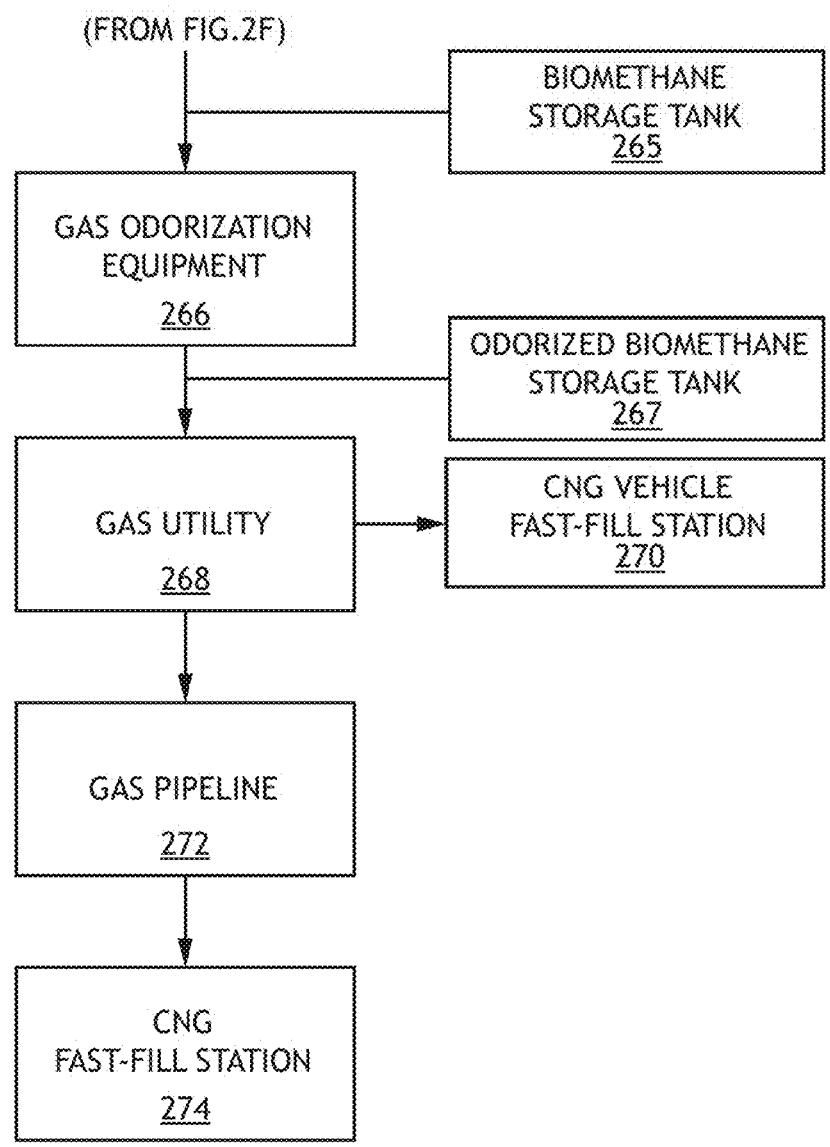
FIG. 2G is a partial view of the system of FIGS. 2A-G according to the inventive concepts disclosed herein.

Referring now to FIG. 2G, in some embodiments, the system 200 includes or configured to provide refined biomethane gas 264 to the biomethane storage tank 265, the gas odorization equipment 266, the odorized biomethane storage tank 267, the gas utility 268, the compressed natural gas (CNG) fast-fill station 270, the gas pipeline 272, and/or the CNG fast-fill station 274.

For example, the gas odorization equipment 266 may include an odorant storage vessel configured to contain an odorant gas, which, for example, may include tert-Butylthiol (t-butyl mercaptan) and/or thiophane. The gas odorization equipment 266 may further include various components, such as a controller, various valves, compressors, and/or other accessories such that a desired amount of odorant gas may be added to (e.g., injected into, such as via pump injector equipment and/or an injector station) the refined biomethane gas 264 to result in an odorized refined biomethane gas.

While the stages and components of FIGS. 2A-2G have been depicted an described as being in an exemplary arrangement such that corresponding processes associated with the stages and components of FIGS. 2A-2G are performed in an exemplary sequential and/or concurrent order, in some embodiments, the stages and components of FIGS. 2A-2G may be implemented in suitable different arrangement such that corresponding processes associated with the stages and components of FIGS. 2A-2G may performed in a different order than depicted and described in FIGS. 2A-G. For example, in some embodiments, the stages and components of FIGS. 2A-2G may be implemented in different suitable arrangement such that corresponding processes associated with the stages and components of FIGS. 2A-2G may performed in a different sequential, concurrent, and/or non-sequential order than depicted and described in FIGS. 2A-G.

Figure 3:
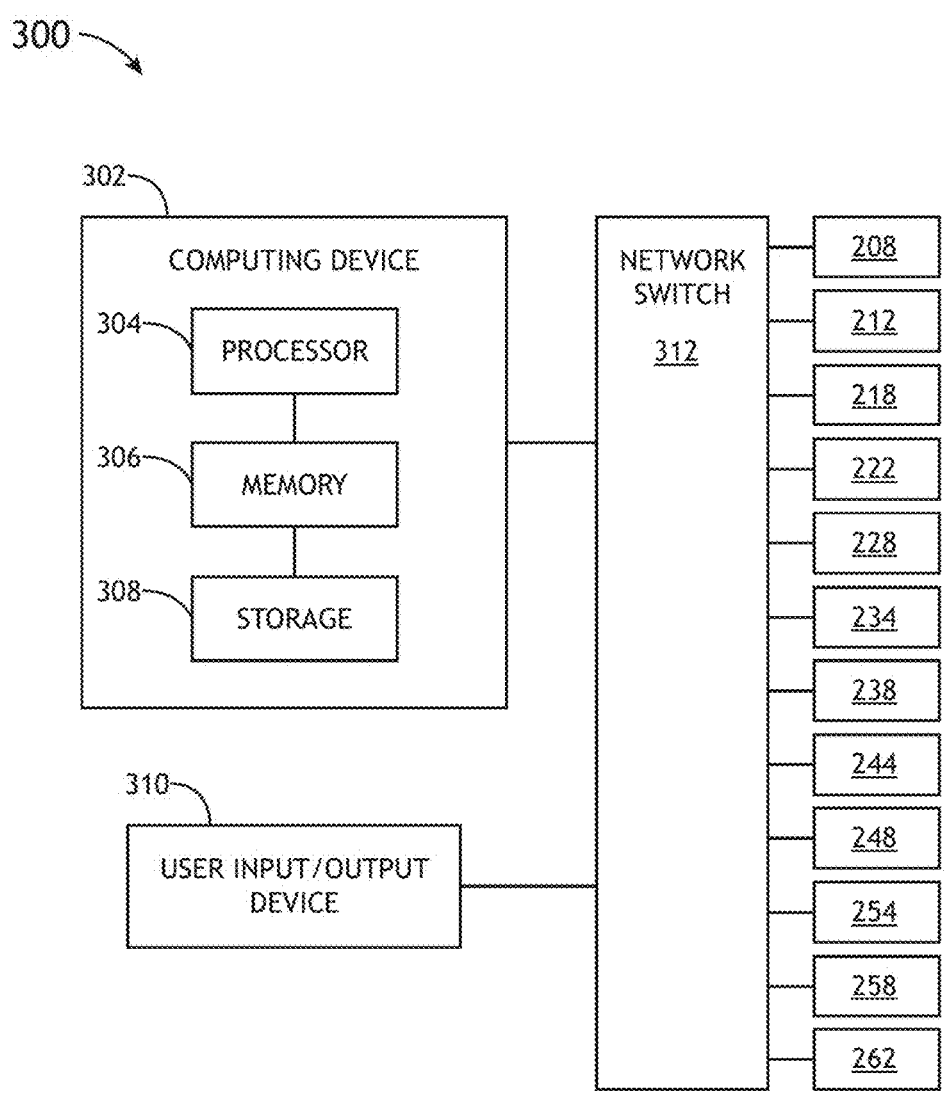
FIG. 3 is a view of a system (e.g., a control system) of the system of FIG. 1A and/or the system of FIGS. 2A-G according to the inventive concepts disclosed herein.

Referring now to FIG. 3, an exemplary embodiment of a system 300 (e.g., a control system, such as an integrated control system) of the system 100 and/or the system 200 according to the inventive concepts disclosed herein is depicted.

As exemplarily depicted, the system 300 (e.g., a control system) may include at least one computing device (e.g., computing device 302), at least one user input/output device (e.g., user input/output device 310), at least network switch (e.g., network switch 312), and one or more controllers (e.g., controllers 208, 212, 218, 222, 228, 234, 238, 244, 248, 254, 258, and/or 262). Some or all of components of the system 300 (e.g., the control system) may be communicatively coupled via any suitable data networks and via any suitable data networking components (e.g., at least one bus, at least one data concentrator, at least one switch, at least router, or a combination thereof). For example, the computing device 302, the user input/output device 310, the network switch 312, and the controllers 208, 212, 218, 222, 228, 234, 238, 244, 248, 254, 258, and 262 may be communicatively coupled.

The computing device 302 may include at least one processor (e.g., a processor 304) and at least one computer-readable medium (e.g., at least one non-transitory computer-readable medium; e.g., memory 306 and storage 308), as well as other components, equipment, and/or devices commonly included in a computing device. The at least one processor and the at least one computer-readable medium may be communicatively coupled to one another.

For example, the processor 304 may be configured to run various software applications or computer code stored (e.g., maintained) in a non-transitory computer-readable medium (e.g., at least one computer-readable medium implemented as hardware; e.g., at least one non-transitory processor-readable medium, at least one memory 306 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device 308 (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof) and configured to execute various instructions or operations. Additionally, for example, the computing device 302 or the processor 304 may be implemented as special purpose computers or special purpose processors configured (e.g., programmed) to execute instructions for performing any or all of the operations disclosed throughout. In some embodiments, system 100, 200, and/or 300 may include any suitable number of computing devices 302, which may be communicatively coupled to one another via any suitable network(s).

For example, the computing device 302 or the processor 304 may be configured to communicate (e.g., send and/or receive data or instructions) with the controllers (e.g., 208, 212, 218, 222, 228, 234, 238, 244, 248, 254, 258, and/or 262). Additionally, the computing device 302 or the processor 304 may be configured to communicate (e.g., send and/or receive data or instructions) with the at least one user input/output device 310 to receive user inputs (e.g., user selections and/or user instructions) from one or more users and/or output data for presentation to one or more user users.

The computing device 302 may be configured to control any or all of the processes and/or components of the system (e.g., 100 and/or 200), such as by sending signals, data, messages, or instructions to any or all of the controllers of the system (e.g., 100 and/or 200).

Additionally, the computing device 302 may be configured to receive data or information associated with any or all of the processes and/or components of the system (e.g., 100 and/or 200), such as by receiving signals, data, messages, or instructions from any or all of the controllers of the system (e.g., 100 and/or 200); for example, such received data or information may be associated with data obtained by any of various sensors or equipment of the system (100 and/ 200), any of various operating states (e.g., activated, deactivated, an amount of activation (e.g., idle activation or standby activation, a partial activation (e.g., five percent activation, 50% activation, 75% activation, 90% activation), and/or fully activated)) such as with respect to a stage or a component of a stage, or the like, such as disclosed throughout. For example, the computing device 302 may be configured to monitor and/or to control any or all of the processes and/or components of the stages of the system (e.g., 100 and/or 200) based at least on such received data and/or information. Additionally, for example, the computing device 302 may be configured to control any or all of the processes and/or components of the system (e.g., 100 and/or 200) based at least on received user inputs, information or data obtained from other computing devices (e.g., from a related system external to the system 100 or 200), and/or the like.

For example, the computing device 302 may be configured to control any or all of the processes and/or components of the stages of the system (e.g., 100 and/or 200) based at least on data obtained by any of various sensors or equipment of the system (100 and/ 200), any of various operating states of at least one stage and/or at least one component of at least one stage, received user inputs, information or data obtained from other computing devices (e.g., from a related system external to the system 100 or 200), and/or the like.

The computing device 302 may be configured to control (e.g., independently control; e.g., control an amount of power, control operation, deactivate, activate, adjust, and/or bypass) one, some, or all of the stages of the systems 100 and/or 200 and some or all of the components (such as of the stages) of the systems 100 and/or 200.

For example, the computing device may be configured to integrally control and/or automate operation of the system 100 or 200 so as to improve (e.g., optimize) operation of the system 100 or 200.

The computing device 302 may be implemented as any suitable computing device, such as a personal computer, a work station computing device, a mobile computing device (e.g., a smart phone, a tablet computing device, a laptop computing device), a server, an internet of things (IOT) computing device, or the like.

While the computing device 302 is exemplarily depicted as a computing device. In some embodiments, the computing device 302 may be implemented as or substituted with a controller (e.g., a master controller) configured to communicate with the other controllers, sensors, or the like of the system 100 or 200 and to control operation of the other controllers of the system 100 or 200.

Each of the at least one user input/output device (e.g., user input/output device 310) may be implemented as any suitable user input/output device, such as display (e.g., a touchscreen display), a keyboard, a speaker, a microphone, a mouse, a button, a camera, a sensor (e.g., a user input sensor), or the like.

The controllers 208, 212, 218, 222, 228, 234, 238, 244, 248, 254, 258, and/or 262, as well as any other controllers of the systems 100, 200, and/or 300 may be implemented as any suitable controllers. For example, at least one (e.g., one, some, or all) of such controllers may be implemented as a computing device controller (e.g., a computing device implemented as a controller where such computing device may be implemented similarly and include components of computing device 302; e.g., an IOT computing device controller), a digital controller (e.g., a digital process controller, such as a programmable logic controller (PLC)), an analog controller (e.g., an analog signal controller), a mixed signal controller, a radiofrequency controller, a pneumatic controller, a hydraulic controller, an electropneumatic controller (e.g., an electronic signal controller further configured to pneumatically control operation of a pneumatic control subsystem (e.g., configured to control operation of one or more pneumatic control valves)), an electrohydraulic controller, an electromagnetic controller, an electromechanical controller, and/or a combination thereof. For example, each of the controllers 208, 212, 218, 222, 228, 234, 238, 244, 248, 254, 258, and 262 may configured as disclosed throughout.

While the system 300 (e.g., the control system) exemplarily includes elements as shown, in some embodiments, one or more of the elements of the system 300 may be omitted, or the system 300 may include other elements. Additionally, while the system 300 is depicted as exemplarily having a particular arrangement and/or configuration of the depicted elements, other embodiments may include any number of elements of various types positioned anywhere in the system 300 and/or elsewhere in the system 100 or 200. Further, while the system 300 is depicted as exemplarily having a depicted number of elements, other embodiments may include any suitable number of elements of various suitable types positioned anywhere in the system 300 and/or the system 100 or 200.

Figure 4:
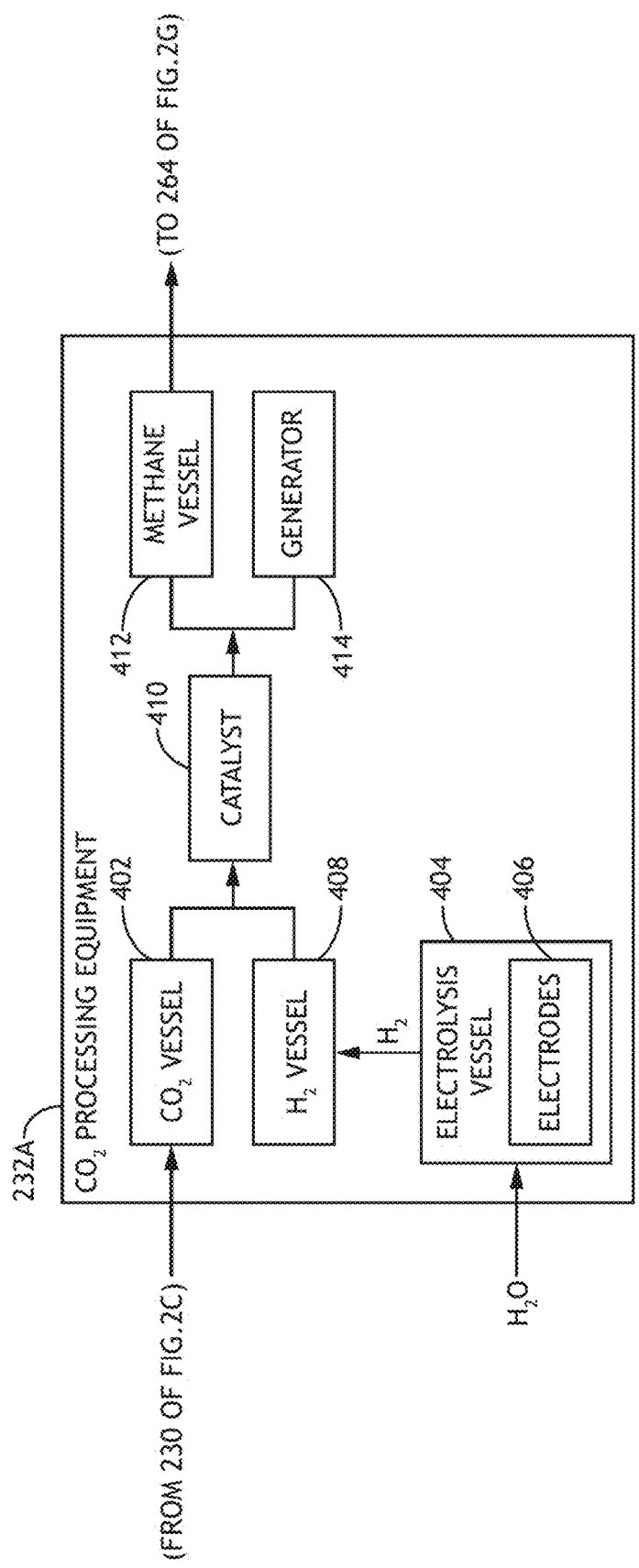
FIG. 4 is a view of carbon dioxide ($CO_2$) processing equipment of the carbon dioxide processing stage of the system of FIGS. 2A-G according to the inventive concepts disclosed herein.

Referring now to FIG. 4, an exemplary embodiment of carbon dioxide ($CO_2$) processing equipment 232A of the carbon dioxide processing stage 232 of the system 200 according to the inventive concepts disclosed herein is depicted.

The carbon dioxide ($CO_2$) processing equipment 232A and/or the carbon dioxide processing stage 232 may include a carbon dioxide vessel 402, an electrolysis vessel 404, a hydrogen ($H_2$) vessel 408, a catalyst 410, a methane vessel 412, and a generator 414.

The electrolysis vessel 404 may include or be implemented as any suitable type of vessel configured for electrolysis. The electrolysis vessel 404 may include electrodes 406, one or more of which may connected to an electrical power source (e.g., an electrical circuit). The electrolysis vessel 404 may be configured to receive a supply of water and convert (e.g., split) the water into hydrogen and oxygen ($O_2$). The oxygen may be captured in any suitable vessel or released into the atmosphere. The hydrogen may be captured and supplied to the hydrogen vessel 408.

The hydrogen vessel 408 may be configured to receive the hydrogen from the electrolysis vessel 404 and supply the hydrogen to a vessel (e.g., containing the catalyst 410).

The carbon dioxide vessel 402 may be configured to receive carbon dioxide (e.g., from the carbon dioxide adsorption vessel assembly 230) and supply the carbon dioxide to the vessel (e.g., containing the catalyst 410).

The vessel (e.g., containing the catalyst 410) may be configured to convert the carbon dioxide and hydrogen into methane, water, and energy, such as by utilizing a Sabatier process (also referred to as a Sabatier reaction). In some embodiments, the vessel (e.g., containing the catalyst 410) is a catalytic converter and/or a conversion vessel. In some embodiments the catalyst 410 may be implemented as or include a nickel-based catalyst, a ruthenium-based catalyst, or an alumina-based catalyst. For example, the catalyst 410 may include nickel, ruthenium, and/or alumina (aluminum oxide). The vessel (e.g., containing the catalyst 410) may output the resulting methane and/or water to any suitable vessel(s) (e.g., the methane vessel 412, the condensate separation vessel 204, and/or any other suitable vessel of the system 200). In some embodiments, the carbon dioxide processing equipment 232A includes a condensate separation vessel and/or dehydration stage configured to remove the water from resulting methane and water such that purified methane may be provided to the methane vessel 412.

The methane vessel 412 may be configured as any suitable vessel. The methane vessel 412 may be configured to receive methane from the vessel (e.g., containing the catalyst 410). Further, in some embodiments, the methane vessel 412 may be configured to provide the methane to any suitable vessel of the system 200, for example, such that the methane produced by utilizing the Sabatier process is eventually incorporated into or mixed with the refined biomethane gas 264.

In some embodiments, the generator 414 may be configured to capture energy (e.g., heat) produced by the Sabatier process and convert such energy into electricity for use by the system 200 or otherwise.

While not shown, the carbon dioxide processing equipment 232A and/or the carbon dioxide processing stage 232 may include one or more controllers, which for example, may be implemented similarly to the controller 208 except that the one or more controllers may be configured to control the carbon dioxide processing equipment 232A, the carbon dioxide processing stage 232, and/or components thereof. For example, the one or more controllers may be configured to control the flow of water, the flow of hydrogen, the power provided to one or more of the electrodes 406, the flow of carbon dioxide, energy (e.g., heat) applied to the vessel (e.g., containing the catalyst 410), a flow of methane, and/or the generator 414.

While the carbon dioxide processing equipment 232A and/or the carbon dioxide processing stage 232 exemplarily includes elements as shown, in some embodiments, one or more of the elements of the carbon dioxide processing equipment 232A and/or the carbon dioxide processing stage 232 may be omitted, or the carbon dioxide processing equipment 232A and/or the carbon dioxide processing stage 232 may include other elements. Additionally, while the carbon dioxide processing equipment 232A and/or the carbon dioxide processing stage 232 is depicted as exemplarily having a particular arrangement and/or configuration of the depicted elements, other embodiments may include any number of elements of various types positioned anywhere in the carbon dioxide processing equipment 232A and/or the carbon dioxide processing stage 232 and/or elsewhere in the system 200. Further, while the carbon dioxide processing equipment 232A and/or the carbon dioxide processing stage 232 is depicted as exemplarily having a depicted number of elements, other embodiments may include any suitable number of elements of various suitable types positioned anywhere in the carbon dioxide processing equipment 232A, the carbon dioxide processing stage 232, and/or the system 200.

Figure 5:
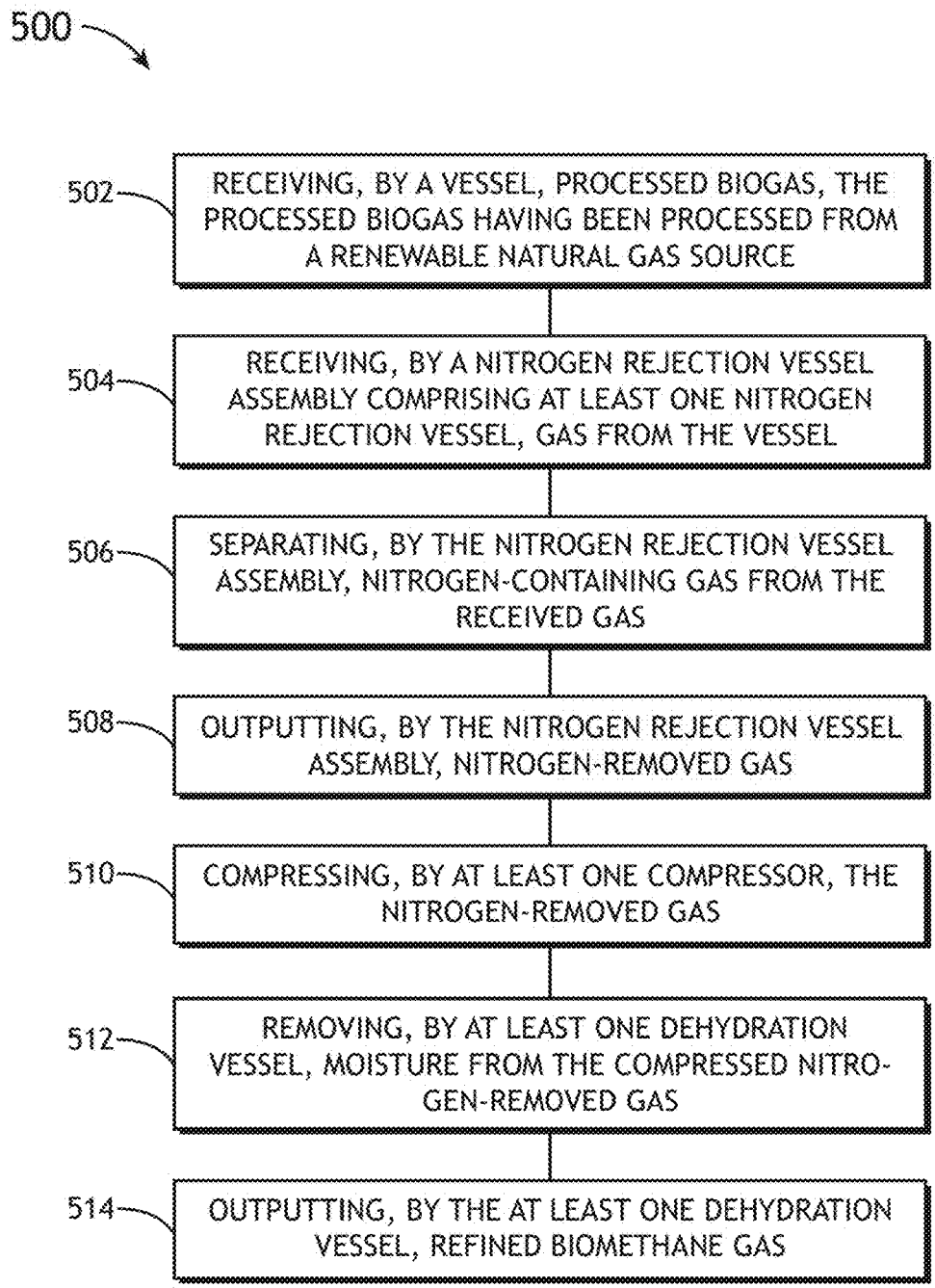
FIG. 5 is a diagram of an exemplary embodiment of a method according to the inventive concepts disclosed herein.

Referring now to FIG. 5, an exemplary embodiment of a method 500 for producing refined biomethane gas from a renewable natural gas source according to the inventive concepts disclosed herein may include one or more of the following steps, which, for example, may be controlled and/or performed by any suitable components or stages as disclosed throughout. Additionally, for example, some embodiments may include performing and/or controlling one more instances of the method 500 iteratively, concurrently, and/or sequentially.

A step 502 may include receiving, by a vessel, processed biogas, the processed biogas having been processed from a renewable natural gas source.

A step 504 may include receiving, by a nitrogen rejection vessel assembly comprising at least one nitrogen rejection vessel, gas from the vessel.

A step 506 may include separating, by the nitrogen rejection vessel assembly, nitrogen-containing gas from the received gas.

A step 508 may include outputting, by the nitrogen rejection vessel assembly, nitrogen-removed gas.

A step 510 may include compressing, by at least one compressor, the nitrogen-removed gas.

A step 512 may include removing, by at least one dehydration vessel, moisture from the compressed nitrogen-removed gas.

A step 514 may include outputting, by the at least one dehydration vessel, refined biomethane gas.

Further, the method 500 may include any of the operations disclosed throughout.

As will be appreciated from the above, embodiments of the inventive concepts disclosed herein may be directed to at least one method, at least one system, and at least one device.

As used throughout and as would be appreciated by those skilled in the art, "at least one non-transitory computer-readable medium" may refer to as at least one non-transitory computer-readable medium (e.g., memory 306, storage 308, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, and more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a condensate separation vessel configured to receive biogas from a renewable natural gas source and remove at least some condensate from the biogas, the biogas including biomethane;
a filter assembly coupled to the condensate separation vessel, the filter assembly configured to receive and filter condensate-removed biogas;
at least one primary compressor coupled to the filter assembly and configured to compress filtered gas received from the filter assembly;
at least one negative temperature heat exchanger coupled to the at least one primary compressor;
at least one carbon adsorption vessel coupled to the at least one negative temperature heat exchanger;
at least one positive temperature change heat exchanger coupled to the at least one carbon adsorption vessel;
at least one carbon dioxide adsorption vessel assembly coupled to the at least one positive temperature change heat exchanger and configured to remove at least some carbon dioxide from gas received by the at least one carbon dioxide adsorption vessel assembly;
at least one gas compressor coupled to the at least one carbon dioxide adsorption vessel assembly;
a first vessel coupled to the at least one gas compressor;
a first nitrogen rejection vessel assembly coupled to the first vessel, the first nitrogen rejection vessel assembly comprising at least one first nitrogen rejection vessel;

at least one first compressor coupled to the first nitrogen rejection vessel assembly, wherein the at least one first compressor provides processed biogas;

a second vessel configured to receive the processed biogas from the at least one first compressor and contain the processed biogas, the processed biogas including biomethane, the processed biogas having been processed from the renewable natural gas source;

a second nitrogen rejection vessel assembly comprising at least one second nitrogen rejection vessel, the second nitrogen rejection vessel assembly coupled to the second vessel, the at least one second nitrogen rejection vessel configured to:
  receive gas from the second vessel;
  separate at least some nitrogen-containing molecules from the received gas; and
  output nitrogen-removed gas;

at least one second compressor coupled to the second nitrogen rejection vessel assembly, the at least one second compressor configured to:
  receive the nitrogen-removed gas from the second nitrogen rejection vessel assembly; and
  compress the nitrogen-removed gas; and at least one dehydration vessel coupled to the at least one second compressor, the at least one dehydration vessel configured to:
  receive the compressed nitrogen-removed gas from the at least one second compressor;
  remove at least some moisture from the compressed nitrogen-removed gas; and
  output refined biomethane gas.

2. The system of claim 1, wherein the system is a landfill biomethane refinery system, wherein the renewable natural gas source is or is from a landfill, and wherein the processed biogas is processed landfill gas.

3. The system of claim 2, wherein the landfill biomethane refinery system is a closed landfill biomethane refinery system, wherein the landfill is a closed landfill, and wherein the processed landfill gas is processed closed landfill gas.

4. The system of claim 3, further comprising a control system comprising at least one controller, the control system configured to control at least one component of the closed landfill biomethane refinery system.

5. The system of claim 1, further comprising at least one controller configured to control at least one of the second vessel, the second nitrogen rejection vessel assembly, one or more of the at least one second nitrogen rejection vessel, one or more of the at least one second compressor, or one or more of the at least one dehydration vessel.

6. The system of claim 1, wherein one or more of the at least one second nitrogen rejection vessel is further configured to:
  output rejected nitrogen-containing molecules; and
  output recycled off-gas to the second vessel to be mixed with the processed biogas,
  wherein the second vessel is further configured to receive the recycled off-gas from the second nitrogen rejection vessel assembly such that the recycled off-gas is mixed with the processed biogas.

7. The system of claim 1, further comprising carbon dioxide processing equipment coupled to the at least one carbon dioxide adsorption vessel assembly, the carbon dioxide processing equipment comprising a conversion vessel including a catalyst, wherein the carbon dioxide processing equipment is configured to:
  receive carbon dioxide from the at least one carbon dioxide adsorption vessel assembly;
  receive hydrogen; and
  convert the carbon dioxide and hydrogen to a mixture comprising methane by utilizing a Sabatier process.

8. The system of claim 1, further comprising a burner configured to receive condensate removed by the condensate separation vessel and configured to burn off the condensate.

9. The system of claim 1, further comprising a flare.

10. The system of claim 1, wherein the system is a closed landfill biomethane refinery system, wherein the landfill is a closed landfill, and wherein the processed landfill gas is processed closed landfill gas.

11. The system of claim 1, further comprising a biomethane storage tank configured to receive the refined biomethane gas.

12. The system of claim 1, wherein the refined biomethane gas is odorized and provided to at least one of a gas utility, a compressed natural gas station, or a natural gas pipeline.

13. The system of claim 1, wherein the at least one dehydration vessel includes a glycol dehydration vessel.

14. The system of claim 1, further comprising a landfill, wherein the renewable natural gas source is or is from the landfill, and wherein the processed biogas is processed landfill gas.

15. The system of claim 1, further comprising a waste treatment plant, wherein the renewable natural gas source is or is from the waste treatment plant.

16. The system of claim 1, further comprising a waste facility, wherein the renewable natural gas source is or is from the waste facility.

17. A system, comprising:
  a condensate separation vessel configured to receive biogas from a renewable natural gas source and remove at least some condensate from the biogas, the biogas including biomethane;
  a filter assembly coupled to the condensate separation vessel, the filter assembly configured to receive and filter condensate-removed biogas;
  at least one primary compressor coupled to the filter assembly and configured to compress filtered gas received from the filter assembly;
  at least one negative temperature heat exchanger coupled to the at least one primary compressor;
  at least one carbon adsorption vessel coupled to the at least one negative temperature heat exchanger;
  at least one positive temperature change heat exchanger coupled to the at least one carbon adsorption vessel;
  at least one carbon dioxide adsorption vessel assembly coupled to the at least one positive temperature change heat exchanger and configured to remove at least some carbon dioxide from gas received by the at least one carbon dioxide adsorption vessel assembly;
  at least one gas compressor coupled to the at least one carbon dioxide adsorption vessel assembly;
  a first vessel coupled to the at least one gas compressor;
  a first nitrogen rejection vessel assembly coupled to the first vessel, the first nitrogen rejection vessel assembly comprising at least one first nitrogen rejection vessel;
  at least one first compressor coupled to the first nitrogen rejection vessel assembly, wherein the at least one first compressor provides processed biogas;
  a second vessel configured to receive the processed biogas from the at least one first compressor and contain the processed biogas, the processed biogas including biomethane, the processed biogas having been processed from the renewable natural gas source;

a second nitrogen rejection vessel assembly comprising at least one second nitrogen rejection vessel, the second nitrogen rejection vessel assembly coupled to the second vessel, the at least one second nitrogen rejection vessel configured to:
  receive gas from the second vessel;
  separate at least some nitrogen-containing molecules from the received gas; and
  output nitrogen-removed gas;
at least one second compressor coupled to the second nitrogen rejection vessel assembly, the at least one second compressor configured to:
  receive the nitrogen-removed gas from the second nitrogen rejection vessel assembly; and
  compress the nitrogen-removed gas; and
at least one dehydration vessel coupled to the at least one second compressor, the at least one dehydration vessel configured to:
  receive the compressed nitrogen-removed gas from the at least one second compressor;
  remove at least some moisture from the compressed nitrogen-removed gas; and
  output refined biomethane gas; and
a control system configured to control at least one of the second vessel, the second nitrogen rejection vessel assembly, one or more of the at least one second nitrogen rejection vessel, one or more of the at least one second compressor, or one or more of the at least one dehydration vessel, the control system comprising at least one controller and a computing device, the computing device including a processor and memory.

* * * * *